(12) United States Patent
Patel et al.

(10) Patent No.: US 10,362,074 B2
(45) Date of Patent: Jul. 23, 2019

(54) SESSION MANAGEMENT AND NOTIFICATION MECHANISMS FOR PUSH-TO-TALK (PTT)

(71) Applicant: Kodiak Networks Inc., Plano, TX (US)

(72) Inventors: Krishnakant M. Patel, Richardson, TX (US); Harisha Mahabaleshwara Negaluguli, Richardson, TX (US); Brahmananda R. Vempati, Dallas, TX (US); Ramu Kandula, Bangalore (IN)

(73) Assignee: KODIAK NETWORKS, INC, Plano, TX (US)

( * ) Notice: Subject to any disclaimer, the term of this patent is extended or adjusted under 35 U.S.C. 154(b) by 193 days.

(21) Appl. No.: 15/013,718

(22) Filed: Feb. 2, 2016

(65) Prior Publication Data
US 2016/0226937 A1    Aug. 4, 2016

Related U.S. Application Data

(60) Provisional application No. 62/111,561, filed on Feb. 3, 2015.

(51) Int. Cl.
*G06F 15/16* (2006.01)
*H04L 29/06* (2006.01)
(Continued)

(52) U.S. Cl.
CPC ........ *H04L 65/4061* (2013.01); *H04L 65/105* (2013.01); *H04L 65/1006* (2013.01);
(Continued)

(58) Field of Classification Search
CPC .......... H04L 65/1016; H04L 65/1006; H04L 65/1069; H04L 65/4016; H04L 65/4061;
(Continued)

(56) References Cited

U.S. PATENT DOCUMENTS

| | | | |
|---|---|---|---|
| 3,912,874 | A | 10/1975 | Botterell et al. |
| 4,796,293 | A | 1/1989 | Blinken et al. |

(Continued)

FOREIGN PATENT DOCUMENTS

| | | | |
|---|---|---|---|
| GB | 2338150 A | | 3/1998 |
| JP | 200392776 A | | 10/2004 |

(Continued)

OTHER PUBLICATIONS

Open Mobile Alliance, "OMA-TS-PoC_ControlPlane-V2_0-20110802-A—OMA PoC Control Plane," Approved Version 2.0, Aug. 2, 2011, 634 pages.
(Continued)

*Primary Examiner* — Farzana B Huq

(57) ABSTRACT

An embodiment method includes receiving, by a notification service running on a processor, a notification from a first component of a push-to-talk (PTT) platform. The notification is for transmission to a PTT client. The method further includes determining, by the notification service, an access transport type used by the PTT client to communicate with the PTT platform, and selecting, by the notification service, a second component to transmit the notification to the PTT client. Selecting the second component is in accordance with the access transport type used by the PTT client. The method further includes transmitting, by the notification service, the notification to the second component.

18 Claims, 17 Drawing Sheets

(51) Int. Cl.
*H04W 4/10* (2009.01)
*H04L 12/703* (2013.01)
*H04L 12/803* (2013.01)

(52) U.S. Cl.
CPC ...... *H04L 65/1016* (2013.01); *H04L 65/1073* (2013.01); *H04L 65/80* (2013.01); *H04W 4/10* (2013.01); *H04L 45/28* (2013.01); *H04L 47/125* (2013.01)

(58) Field of Classification Search
CPC . H04L 67/10; H04L 67/1008; H04L 67/1029; H04L 67/1042; H04L 67/303; H04L 67/42
USPC .................................................. 709/205–207
See application file for complete search history.

(56) References Cited

U.S. PATENT DOCUMENTS

| | | |
|---|---|---|
| 5,353,328 A | 10/1994 | Jokimies |
| 5,390,341 A * | 2/1995 | Ziniel ................. H04B 1/3822 455/194.1 |
| 5,442,809 A | 8/1995 | Diaz et al. |
| 5,546,449 A | 8/1996 | Hogan et al. |
| 5,711,011 A | 1/1998 | Urs et al. |
| 5,752,196 A | 5/1998 | Ahvenainen et al. |
| 5,987,318 A | 11/1999 | Alperovich et al. |
| 5,987,331 A | 11/1999 | Grube et al. |
| 6,011,976 A | 1/2000 | Michaels et al. |
| 6,021,326 A | 2/2000 | Nguyen |
| 6,138,011 A | 10/2000 | Sanders, III et al. |
| 6,141,556 A | 10/2000 | Dougherty et al. |
| 6,192,119 B1 | 2/2001 | Wilson |
| 6,304,558 B1 | 10/2001 | Mysore |
| 6,397,054 B1 | 5/2002 | Hoirup et al. |
| 6,405,030 B1 | 6/2002 | Suprunov |
| 6,411,815 B1 | 6/2002 | Balasuriya |
| 6,473,501 B1 | 10/2002 | Paulsrud |
| 6,477,366 B1 | 11/2002 | Valentine et al. |
| 6,477,387 B1 | 11/2002 | Jackson et al. |
| 6,549,773 B1 | 4/2003 | Linden et al. |
| 6,577,874 B1 | 6/2003 | Dailey |
| 6,606,305 B1 | 8/2003 | Boyle et al. |
| 6,628,937 B1 | 9/2003 | Salin |
| 6,661,878 B1 | 12/2003 | Mirashrafi et al. |
| 6,725,053 B2 | 4/2004 | Rosen et al. |
| 6,751,468 B1 | 6/2004 | Heubel et al. |
| 6,801,762 B1 | 10/2004 | Huilgol |
| 6,856,676 B1 | 2/2005 | Pirot et al. |
| 6,865,398 B2 | 3/2005 | Mangal et al. |
| 6,892,074 B2 | 5/2005 | Tarkiainen et al. |
| 6,895,254 B2 | 5/2005 | Dorenbosch |
| 6,898,436 B2 | 5/2005 | Crockett et al. |
| 6,993,355 B1 | 1/2006 | Pershan |
| 6,996,414 B2 | 2/2006 | Vishwanathan et al. |
| 7,026,926 B1 | 4/2006 | Walker, III |
| 7,043,266 B2 | 6/2006 | Chaturvedi et al. |
| 7,082,316 B2 | 7/2006 | Elden et al. |
| 7,085,364 B1 | 8/2006 | Ahmed et al. |
| 7,099,291 B2 | 8/2006 | Harris et al. |
| 7,123,905 B1 | 10/2006 | Allaway et al. |
| 7,170,863 B1 | 1/2007 | Denman et al. |
| 7,231,225 B2 | 6/2007 | Rao et al. |
| 7,236,580 B1 | 6/2007 | Sarkar et al. |
| 7,330,540 B2 | 2/2008 | Darby et al. |
| 7,366,535 B2 | 4/2008 | Glass et al. |
| 7,403,775 B2 | 7/2008 | Patel et al. |
| 7,460,861 B2 | 12/2008 | Zabawskj |
| 7,529,557 B2 | 5/2009 | Farrill |
| 7,689,238 B2 | 3/2010 | Biswas et al. |
| 7,738,861 B2 | 6/2010 | Fournier |
| 7,738,892 B2 | 6/2010 | Ayyasamy et al. |
| 7,738,896 B2 | 6/2010 | Patel et al. |
| 7,751,348 B2 | 7/2010 | Shaffer et al. |
| 7,764,950 B2 | 7/2010 | Patel et al. |
| 7,787,896 B2 | 8/2010 | Kundu et al. |
| 7,797,010 B1 | 9/2010 | Manroa et al. |
| 7,813,722 B2 | 10/2010 | Patel et al. |
| 7,853,279 B2 | 12/2010 | Patel et al. |
| 8,036,692 B2 | 10/2011 | Ayyasamy et al. |
| 8,244,252 B2 | 8/2012 | Descombes |
| 8,369,829 B2 | 2/2013 | Nagubhai et al. |
| 8,478,261 B2 | 7/2013 | Vempati et al. |
| 8,498,660 B2 | 7/2013 | Lawler et al. |
| 8,670,760 B2 | 3/2014 | Lawler et al. |
| 8,676,189 B2 | 3/2014 | Lawler et al. |
| 2001/0005372 A1 | 6/2001 | Cave et al. |
| 2002/0009990 A1 | 1/2002 | Kleier et al. |
| 2002/0024943 A1 | 2/2002 | Karaul et al. |
| 2002/0077136 A1 | 6/2002 | Maggenti et al. |
| 2002/0086659 A1 | 7/2002 | Lauper |
| 2002/0086676 A1 | 7/2002 | Hendrey et al. |
| 2002/0102989 A1 | 8/2002 | Calvert et al. |
| 2002/0187750 A1 | 12/2002 | Majumdar |
| 2002/0196781 A1 | 12/2002 | Salovuori |
| 2003/0009463 A1 | 1/2003 | Gallant |
| 2003/0016632 A1 | 1/2003 | Refai et al. |
| 2003/0017836 A1 | 1/2003 | Vishwanathan et al. |
| 2003/0078064 A1 | 4/2003 | Chan |
| 2003/0119540 A1 | 6/2003 | Mathis |
| 2003/0148779 A1 | 8/2003 | Aravamudan et al. |
| 2003/0149774 A1 | 8/2003 | McConnell et al. |
| 2003/0153343 A1 | 8/2003 | Crockett et al. |
| 2003/0169859 A1 | 9/2003 | Strathmeyer et al. |
| 2003/0190888 A1 | 10/2003 | Mangal et al. |
| 2004/0032843 A1 | 2/2004 | Schaefer et al. |
| 2004/0057449 A1 | 3/2004 | Black |
| 2004/0067751 A1 | 4/2004 | Vandermeijden et al. |
| 2004/0095954 A1 | 5/2004 | Varney et al. |
| 2004/0121760 A1 | 6/2004 | Wetman et al. |
| 2004/0127233 A1 | 7/2004 | Harris et al. |
| 2004/0152441 A1 | 8/2004 | Wong |
| 2004/0176100 A1 | 9/2004 | Florkey et al. |
| 2004/0179531 A1 | 9/2004 | Bi et al. |
| 2004/0196826 A1 | 10/2004 | Bao et al. |
| 2004/0203793 A1 | 10/2004 | Dorenbosch |
| 2004/0219941 A1 | 11/2004 | Haaramo et al. |
| 2004/0224710 A1 | 11/2004 | Koskelainen et al. |
| 2004/0228292 A1 | 11/2004 | Edwards |
| 2004/0259580 A1 | 12/2004 | Florkey et al. |
| 2005/0047362 A1 | 3/2005 | Harris et al. |
| 2005/0101308 A1 | 5/2005 | Lee |
| 2005/0105695 A1 | 5/2005 | Xi |
| 2005/0111430 A1 | 5/2005 | Spear et al. |
| 2005/0119012 A1 | 6/2005 | Merheb et al. |
| 2005/0143135 A1 | 6/2005 | Brems et al. |
| 2005/0164737 A1 | 7/2005 | Brown |
| 2005/0180394 A1 * | 8/2005 | Kautz ................. H04L 12/5692 370/352 |
| 2005/0189337 A1 | 9/2005 | Baune |
| 2005/0192041 A1 | 9/2005 | Oxley et al. |
| 2005/0202807 A1 | 9/2005 | Ayyasamy et al. |
| 2005/0221819 A1 | 10/2005 | Patel et al. |
| 2005/0232241 A1 | 10/2005 | Wu et al. |
| 2005/0239485 A1 | 10/2005 | Kundu et al. |
| 2005/0254464 A1 | 11/2005 | Patel et al. |
| 2005/0261016 A1 | 11/2005 | Patel et al. |
| 2006/0003740 A1 | 1/2006 | Munje |
| 2006/0003751 A1 | 1/2006 | Vo |
| 2006/0019654 A1 | 1/2006 | Farrill |
| 2006/0029189 A1 | 2/2006 | Patel et al. |
| 2006/0030347 A1 | 2/2006 | Biswas |
| 2006/0056361 A1 | 3/2006 | Jiang et al. |
| 2006/0067499 A1 | 3/2006 | Oliveira et al. |
| 2006/0078064 A1 | 4/2006 | Schmidt et al. |
| 2006/0094455 A1 | 5/2006 | Hannu et al. |
| 2006/0116150 A1 | 6/2006 | Bhutiani |
| 2006/0128411 A1 | 6/2006 | Turcanu |
| 2006/0178138 A1 | 8/2006 | Ostroff et al. |
| 2006/0189337 A1 | 8/2006 | Farrill et al. |
| 2006/0198334 A1 | 9/2006 | Civanlar et al. |
| 2006/0229090 A1 | 10/2006 | Ladue |
| 2006/0234687 A1 | 10/2006 | Patel et al. |

(56) References Cited

U.S. PATENT DOCUMENTS

| | | |
|---|---|---|
| 2007/0037562 A1 | 2/2007 | Smith-Kerker et al. |
| 2007/0037597 A1 | 2/2007 | Biswas et al. |
| 2007/0037598 A1 | 2/2007 | Ayyasamy et al. |
| 2007/0049314 A1 | 3/2007 | Balachandran et al. |
| 2007/0070976 A1 | 3/2007 | Mussman et al. |
| 2007/0099609 A1 | 5/2007 | Cai |
| 2007/0133757 A1 | 6/2007 | Girouard et al. |
| 2007/0154005 A1 | 7/2007 | Daigle |
| 2007/0189487 A1 | 8/2007 | Sharland et al. |
| 2007/0190492 A1 | 8/2007 | Schmitt |
| 2007/0190984 A1 | 8/2007 | Ayyasamy et al. |
| 2007/0197234 A1 | 8/2007 | Gill et al. |
| 2007/0204039 A1 | 8/2007 | Inamdar |
| 2007/0217591 A1 | 9/2007 | Yasuma |
| 2007/0218885 A1 | 9/2007 | Pfleging et al. |
| 2007/0253347 A1 | 11/2007 | Patel et al. |
| 2008/0045256 A1* | 2/2008 | Wang ............... H04W 4/16 455/518 |
| 2008/0064364 A1 | 3/2008 | Patel et al. |
| 2008/0126230 A1 | 5/2008 | Bellora et al. |
| 2008/0147671 A1 | 6/2008 | Simon et al. |
| 2008/0299953 A1 | 12/2008 | Rao |
| 2008/0318610 A1* | 12/2008 | Bhaskaran ......... H04W 76/005 455/518 |
| 2009/0070456 A1 | 3/2009 | Brown et al. |
| 2009/0092116 A1 | 4/2009 | Jiang et al. |
| 2009/0119678 A1 | 5/2009 | Shih et al. |
| 2009/0149167 A1 | 6/2009 | Patel et al. |
| 2009/0209235 A1 | 8/2009 | Lawler et al. |
| 2009/0252076 A1* | 10/2009 | Song ............... H04W 72/005 370/312 |
| 2009/0325540 A1 | 12/2009 | Yach et al. |
| 2010/0035593 A1 | 2/2010 | Fanco et al. |
| 2010/0142414 A1 | 6/2010 | Patel et al. |
| 2010/0190492 A1 | 7/2010 | Jiang |
| 2010/0208648 A1 | 8/2010 | Narkar et al. |
| 2010/0234018 A1 | 9/2010 | Lawler et al. |
| 2011/0151917 A1 | 6/2011 | Mao et al. |
| 2011/0183659 A1 | 7/2011 | Ayyasamy et al. |
| 2011/0250923 A1 | 10/2011 | Miller et al. |
| 2012/0110115 A1* | 5/2012 | Lin .................. H04L 12/66 709/217 |
| 2012/0236823 A1 | 9/2012 | Kompella et al. |
| 2013/0155875 A1 | 6/2013 | Ayyasamy et al. |
| 2013/0196706 A1 | 8/2013 | Patel et al. |
| 2013/0337859 A1 | 12/2013 | Patel et al. |
| 2014/0148210 A1 | 5/2014 | Kundu et al. |
| 2014/0221034 A1* | 8/2014 | Renko ............... H04W 76/45 455/518 |
| 2014/0221035 A1* | 8/2014 | Denman ............. H04W 4/10 455/518 |
| 2014/0233447 A1* | 8/2014 | Ofir ................. H04W 4/10 370/312 |

FOREIGN PATENT DOCUMENTS

| | | |
|---|---|---|
| WO | 00069189 | 11/2000 |
| WO | 0079825 A1 | 12/2000 |
| WO | 0167674 A2 | 9/2001 |
| WO | 02101981 A1 | 12/2002 |
| WO | 03101007 A1 | 12/2003 |
| WO | 2005009006 A2 | 1/2005 |
| WO | 2005112494 A1 | 11/2005 |
| WO | 2005115032 A1 | 12/2005 |
| WO | 2005117474 A1 | 12/2005 |
| WO | 2006105287 A2 | 10/2006 |
| WO | 2010048217 A1 | 4/2010 |
| WO | 2010117815 A1 | 10/2010 |
| WO | 2014207305 A | 12/2014 |

OTHER PUBLICATIONS

Open Mobile Alliance, "OMA-TS-PoC_Document_Management-V2_0-20110802-A—OMA PoC Document Management," Approved Version 2.0, Aug. 2, 2011, 29 pages.

Open Mobile Alliance, "OMA-TS-PoC_UserPlane-V2_0-20110802-A—PoC User Plane" Approved Version 2.0, Aug. 2, 2011, 292 pages.

Open Mobile Alliance, OMA-TS-Presence_SIMPLE-V2_0-20120710-A—Presence SIMPLE Specification, Approved Version 2.0, Jul. 10, 2012, 102 pages.

Open Mobile Alliance, "OMA-TS-Presence_SIMPLE_XDM-V2_0-20120710-A—Presence XDM Specification," Approved Version 2.0, Jul. 10, 2012, 40 pages.

Open Mobile Alliance, "OMA-AD-PoC-V2_0-20110802-A—Push to talk over Cellular (PoC)—Architecture," Approved Version 2.0; Aug. 2, 2011, 50 pages.

Open Mobile Alliance, "OMA-TS-Presence_SIMPLE_RLS-V1_0-20120710-A—Resource List Server (RLS) Specification," Approved Version 1.0, Jul. 10, 2012, 17 pages.

Open Mobile Alliance, "OMA-TS-Presence_SIMPLE_RLS_XDM-V2_0-20120710-A—Resource List Server (RLS) XDM Specification," Approved Version 2.0, Jul. 10, 2012, 16 pages.

Open Mobile Alliance, "OMA-TS-XDM_Shared_Group-V1_0-20120403-A—Shared Group XDM Specification," Approved Version 1.0; Apr. 3, 2012, 36 pages.

Open Mobile Alliance, "OMA-TS-XDM_Shared_List-V2_0-20120403-A—Shared List XDM Specification," Approved Version 2.0; Apr. 3, 2012, 20 pages.

Open Mobile Alliance, "OMA-TS-XDM_Core-V2_0-20120403-A—XML Document Management (XDM) Specification," Approved Version 2.0, Apr. 3, 2012, 75 pages.

ETSI: "ETSI TS 100 812-2 v2.3.1 Terrestrial Trunked Radio (TETRA) Subscriber Identity Module to Mobile Equipment (SIM-ME) interface; Part 2: Universal Integrated Circuit Card (UfCC) Characteristics of the TSIM application", ETSI Technical Specification, Oct. 2003, all pages.

Nokia: "What is TETRA? Why Nokia TETRA?", The Nokia TETRA Primer, 2002, pp. 1-29.

Skype: "Skype", Web Archive—SKYPE, May 22, 2004, pp. 1-2, May 22, 2004, pp. 1-2.

Trachwell: "TrackWell Software and Tetra Iceland deliver value added services to Tetra users", Trackwell.com, Oct. 2002, pp. 1-1.

* cited by examiner

SESSION MANAGEMENT AND NOTIFICATION MECHANISMS FOR PUSH-TO-TALK (PTT)

This application claims the benefit of U.S. Provisional Application No. 62/111,561 filed on Feb. 3, 2015, entitled "Session Management and Notification Mechanisms for Next Generation Push-To-Talk-Over-Cellular (PoC) Service," which application is hereby incorporated herein by reference.

TECHNICAL FIELD

The present invention relates generally to communications over a telecommunications network, and in particular embodiments, to techniques and mechanisms for a system and method for elastic scaling in push-to-talk (PTT).

BACKGROUND

Push-to-talk (PTT) platforms involve providing PTT functionality (e.g., call group management, call origination, call transmittal, talk-back call termination, floor management, filtering, etc.) through clients on client devices. The PTT functions may be performed by one or more servers, and communications between the client devices and the servers may be performed over a telecommunications network (e.g., a carrier network in the case of PTT-Over-Cellular (PoC) or other types of networks). An aspect of PTT solutions is to provide robust client connectivity and notification mechanism(s).

SUMMARY OF THE INVENTION

Technical advantages are generally achieved, by embodiments of this disclosure which describe systems and methods for providing session management and notifications in a PTT environment.

In accordance with an embodiment, a method includes receiving, by a notification service running on a processor, a notification from a first component of a push-to-talk (PTT) platform. The notification is for transmission to a PTT client. The method further includes determining, by the notification service, an access transport type used by the PTT client to communicate with the PTT platform, and selecting, by the notification service, a second component to transmit the notification to the PTT client. Selecting the second component is in accordance with the access transport type used by the PTT client. The method further includes transmitting, by the notification service, the notification to the second component.

In accordance with an embodiment, a notification service includes one or more processors and a computer readable storage medium storing programming for execution by the one or more processors. The programming includes instructions to receive a notification from a first component of a push-to-talk (PTT) platform. The notification is for transmission to a PTT client on a client device. The programming includes further instructions to determine an access transport type used by the PTT client to communicate with the PTT platform, select a second component to transmit the notification to the PTT client, and transmit the notification to the second component. The access transport type used by the PTT client is stored in a database, and selecting the second component is in accordance with the access transport type used by the PTT client.

In accordance with an embodiment, a push-to-talk (PTT) platform includes a database, one or more processors, and a computer readable storage medium storing programming for execution by the one or more processors. The programming includes instructions to provide a session initial proxy (SIP) registrar. The SIP registrar is configured to store an access transport type of a PTT client in the database. The programming includes instructions to provide a PTT application service to a PTT client on a client device and provide a notification service. The notification service is configured to receive a notification from the PTT application service. The notification is addressed to the PTT client. The notification service is further configured to determine the access transport type of the PTT client, select a component to transmit the notification to the PTT client, and transmit the notification to the component. Selecting the component is in accordance with the access transport type of the PTT client.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims.

Various embodiments are described within a specific context, namely, session management and notification in a push-to-talk (PTT) system. Various embodiments may, however, be applied to other systems and networks, such as other telecommunications services platforms, where session management and notification services are desired.

Various embodiments as described below provide connectivity (e.g., session management) and notification mechanisms with reduced latency. Various embodiments may further provide carrier-grade reliability features, such as geographical level fault-tolerance for session management and/or notification.

Figure 1:
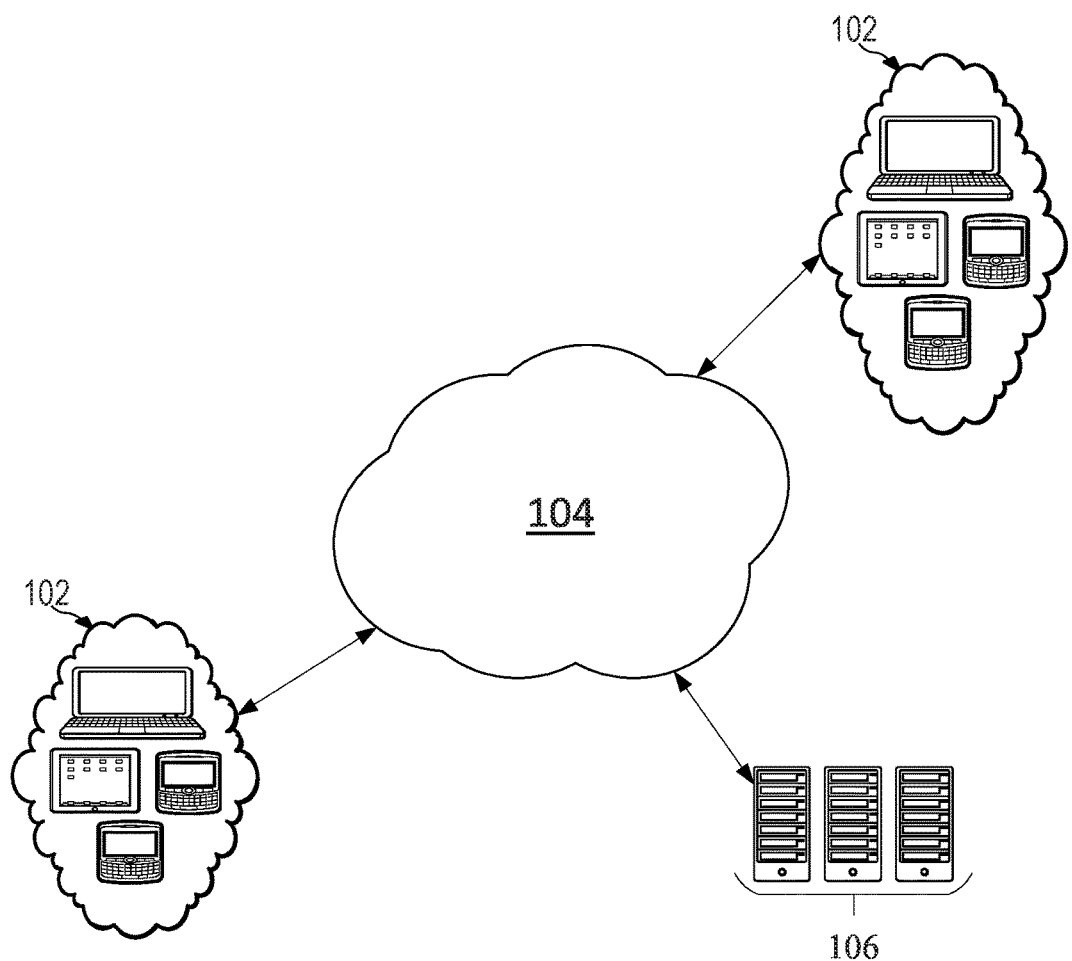
FIG. 1 illustrates a diagram of an embodiment communications network according to some embodiments.

FIG. 1 illustrates a communications system 100, which provides an architecture for supporting a PTT communications solution in accordance with some embodiments. Communications system 100 includes client devices 102, a communications network 104, and a PTT platform 106. As used herein, the term "client device" refers to any component (or collection of components) capable of establishing a connection with a communications network, such as a user equipment (UE), a mobile station (STA), a cellular phone, a tablet, a laptop, and other wired/wirelessly enabled devices. Applications (referred to hereinafter as "PTT clients") reside on client devices 102 for accessing various PTT functions.

Client devices 102 may communicate with PTT platform 106 over network 104, which may be accessed by client devices 102 through a cellular network deployed by a carrier, a WiFi network, a radio access network (RAN), other wireless networks, a wired internet protocol (IP) network, combinations thereof, or the like. Network 104 may include one or more components configured to provide wireless or wired network access, such as an enhanced base station (eNB), a macro-cell, a femtocell, a Wi-Fi access point (AP), combinations thereof, or the like. Furthermore, network 104 may operate in accordance with one or more wireless communication protocols, e.g., open mobile alliance (OMA), long term evolution (LTE), LTE advanced (LTE-A), High Speed Packet Access (HSPA), Wi-Fi 802.11a/b/g/n/ac, etc. In some embodiments, network 104 may comprise various other devices, such as relays, low power nodes, etc. Network 104 may further include backhaul network components, such as various gateways, routers, controllers, schedulers, and the like.

In an embodiment where PTT platform 106 is a PTT-over-Cellular (PoC) platform, subscribers to a PTT solution (e.g., users operating client devices 102) may be provisioned onto system 100 via interfaces to carriers (e.g., cellular carriers). PTT customers (e.g., enterprises) can administer these subscribers to form closed groups for PTT communications. The PTT solution may interface with the carrier, for example, by including connectivity to the carrier's core network, billing interfaces, provisioning interfaces, lawful intercept interfaces, customer care interfaces, and the like. PTT platform 106 may provide a plurality of PTT functions to client devices 102 through the PTT clients on client devices 102 as described in greater detail below.

In some embodiments, PTT platform 106 uses container technology for virtualization of a PTT system architecture, such as, the virtualization of provided PTT services. Example container technologies may include Docker, Rocket, LXD, and the like although the architecture is not limited to a specific container technology. Virtualization using container technology may allow PTT platform 106 to adopt a micro-services model in which service clusters are considered the building blocks of the system architecture. For example, each function provided by PTT platform 106 may be virtualized in a unique service cluster, and each service cluster may perform a different function in PTT platform 106. Service clusters are hosted on virtual machines of an embodiment cloud network. An embodiment cloud network may include a plurality of geographically diverse deployment sites (e.g., data centers) where various virtual machines are physically deployed. Decomposition of the system into a set of services allows each service (e.g., each function provided by the PTT platform) to be independently deployed and managed. Thus, system resilience may be improved as failures are localized to individual services. Furthermore, rapid and agile deployment of services may also be achieved.

In some embodiments, PTT platform 106 incorporates distributed databases, clustering technologies, data analytics tools, and messaging middleware to provide a robust, scalable platform. PTT platform 106 may use fully virtualized components with a layered approach to service orchestration, which allows PTT platform 106 to be integrated into various cloud environments, such as a carrier's private cloud infrastructure, a dedicated PTT cloud infrastructure, combinations thereof, and the like. A more detailed description of an embodiment telecommunications platform may be found in commonly-assigned U.S. patent application Ser. No. 14/994,757 filed on Jan. 13, 2016, entitled "System and Method for Elastic Scaling using a Container-Based Platform," which is hereby incorporated by reference. Other telecommunication services platforms, including other PTT platforms, may be used in other embodiments.

Various PTT clients on client devices 102 may use different access transport types to communicate with PTT platform 106. In an embodiment, PTT clients on client devices 102 connect to PTT platform 106 through an IP multimedia subsystem (IMS) core network, and various servers of PTT platform 106 are connected to the IMS core network.

In another embodiment, PTT clients on client devices 102 connect to PTT platform 106 through non-IMS IP networks, which may include trusted and/or un-trusted networks. In an embodiment, connection through a trusted network may include an operator providing a direct interface to the operator's wireless data network (e.g., a LTE packet data network gateway (PGW)). In such embodiments, specific firewall rules may be provided to mark PTT server traffic of PTT platform 106 as trusted, which may relax one or more operator firewall rules and allow for simplified connectivity/notification mechanisms. In an embodiment, connection through an untrusted IP network (e.g., the Internet) includes addressing additional security and firewall issues as explained in greater detail below. For both trusted and untrusted network connectivity, transport protocols (e.g., user datagram protocol (UDP), transmission control protocol (TCP), a combination thereof, or the like) are utilized to provide various notification channels for connection recovery methods as described in subsequent paragraphs.

In some embodiments, notification mechanisms (e.g., push notification mechanisms) are based on the access transport type, such as of transport protocol and/or the type of network connection (e.g., trusted or untrusted), used for connectivity between PTT clients on client devices 102 and PTT platform 106. Various notification mechanisms may include using a generic push notification service utilizing IMS registration, allowing in-network application servers and external application servers to push notifications to PTT clients, using operating system (OS) push notification services (e.g., Andriod or iOS push services), using WebSocket or other UDP-based session initiation protocol (SIP) registration with keep-alive functionality, combinations thereof, and the like.

In an embodiment, a generic push notification uses IMS registration procedures (e.g., SIP registration), which may not require maintaining redundant paths with application server(s) pushing the notification(s). In an embodiment, allowing in-network app servers and external app servers to push notifications to PTT clients may include a token based authentication scheme where a user (e.g., client device 102) provides an authentication token allowing application servers to push notifications to the user. In an embodiment, using OS push notification services may risk notifications being delivered to a specific device instead of a specific user. To address this risk, an IMS-based method can provide mechanism(s) to bind user identification (ID) with UE registration, which allows applications to deliver notifications to specific users instead of a device. For example when a user switches to a second device from a first device, the application may deliver the notification to the second device based on the user ID (as identified by the service from device registration), rather than the first device. The user-based notification delivery mechanism may further be extended to non-IMS notification schemes as well in some embodiments. In an embodiment, non-IMS notification schemes (e.g., using WebSocket or UDP based SIP registration with keep-alive) may use redundant paths to maintain a constant connection between the PTT servers and a PTT client.

Embodiments may provide robust session management for PTT platform 106. An embodiment session management and notification mechanism may provide redundancies so that failure of one or more service components (e.g., failed container instances, failed service clusters, failed data centers, etc.) does not cause a service outage for PoC users. For example, various failover and reconnection mechanisms are may be handled seamlessly by PTT platform 106 for a user. Mechanisms for handling seamless failover/reconnection may include one or more of: a geographically redundant notification channel to recover from stale sessions, event driven recovery logic, session management and registrar load balancing, and redundancy logic as explained in greater detail below.

Furthermore, embodiments may use "home" sites for load balancing and reducing latency during a session. An embodiment session registration protocol includes PTT platform 106 receiving a session registration request (e.g., a SIP REGISTER request) from a PTT client. PTT platform 106 then selects a deployment site to serve the SIP REGISTER request. For example, PTT platform 106 may include a plurality of geographically diverse deployment sites for hosting various application servers (e.g., virtual servers encapsulated in containers and hosted on virtual machines at the deployment site). A SIP proxy server at one of the deployment sites may be selected to serve the SIP REGISTER request based on the PTT client's geographic location (e.g., as determined by an IP address of the PTT client), a weighted round robin scheme, or the like. Once a deployment site is selected for serving the SIP REGISTER request from the PTT client, the deployment site is considered the home site for the duration of the PTT client's connection session. Various services used by the client are provided from the same home site. For example, the home site information may be returned as SIP path information in the REGISTER response to the PTT client, and the PTT client uses this SIP path information to direct all subsequent SIP service requests to the home site. Similarly, the PTT client is provided home site specific route information as part of a login session establishment procedure for other services.

Figure 2:
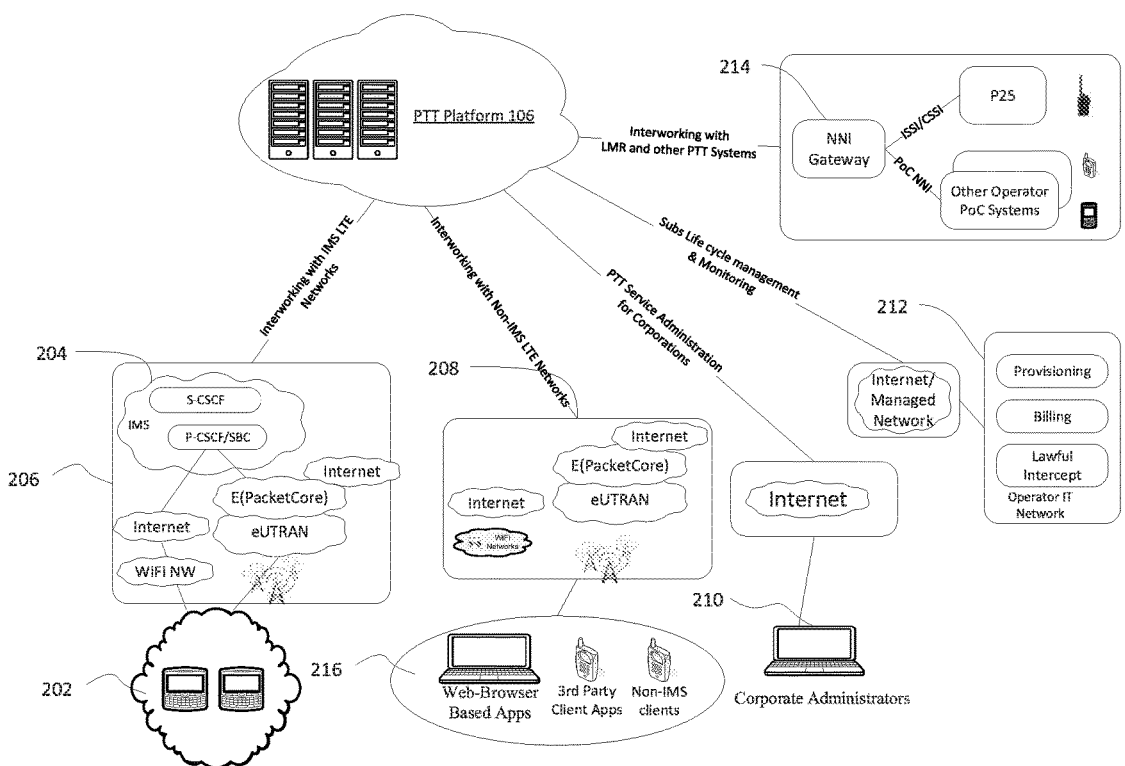
FIGS. 2 through 6 illustrate block diagrams of various network interfaces between a PTT platform and a PTT clients according to some embodiments.

FIG. 2 illustrates a block diagram of an embodiment PTT platform 106 according to some embodiments. Specifically, FIG. 2 illustrates interfaces between PTT platform 106 and various external networks. An IMS network 204 provides connectivity between PTT platform 106 and IMS-based PTT clients 202 in an operator's network 206 (e.g., a carrier's cellular network). As illustrated by FIG. 2, PTT platform 106 may also maintain non-IMS interfaces for carrying out additional functions to complement IMS network 204 and provide a more comprehensive PTT solutions. For example, PTT platform 106 may maintain internetworking with non-IMS LTE networks 208 to support non-IMS-based clients 216 (e.g., web browser based applications, third party client applications, non-IMS PTT clients, and the like), provide PTT service administration for corporations (e.g., corporate administrators 210) over the Internet, provide subscription life cycle management and monitoring over the Internet and/or a managed network to an operator's information technology (IT) network 212, provide internetworking connections with land mobile radio (LMR) systems or other PTT systems through one or more gateways 214, and the like. Table 1 below illustrates details regarding PTT client connectivity options in a first embodiment communications platform.

TABLE 1

PTT Client Connectivity Options in a First Embodiment Communications Platform

| PTT Client Type | Interface | Access Network | Transport Protocol | Network Address Translation (NAT) Timer Dependent? |
|---|---|---|---|---|
| Mobile Client | SIP-Primary Channel | LTE/4G, WiFi | TLS/TCP/IPV4 | Auto-detected |
| | | LTE/4G | UDP/IPV6 | No NAT |
| | SIP-Secondary Channel | LTE/4G, WiFi | TLS/TCP/IPV4 | Auto-detected |
| | | LTE/4G | UDP/IPV6 | Unsolicited IPV6 |
| | Media-Primary Channel | LTE/4G | RTP/RTCP over DTLS/UDP/IPV4 | At least 30 minutes |
| | | LTE/4G | RTP/RTCP over UDP/IPV6 | No NAT |
| | | WiFi | RTP/RTCP over TLS/IPV4 or TLS/IPV6 | Auto-detected |
| Browser Client | SIP | WiFi/Internet | TLS/TCP | Auto-detected |
| | RTP, RTCP | WiFi/Internet | WebRTC | Auto-detected |
| | MBCP | WiFi/Internet | MBCP over SIP | Auto-detected |

As another example, Table 2 below illustrates details regarding PTT client connectivity options in a second embodiment communications platform. In some embodiments, the second embodiment communications platform provides unification of transport protocols in a next generation architecture.

TABLE 2

PTT Client Connectivity Options in a Second Embodiment Communications Platform

| Client Type | Interface | Access Network | Transport Protocol | NAT Timer Dependent? |
|---|---|---|---|---|
| Mobile Client/ Browser Client | SIP-Primary Channel over IMS(ISC) | LTE/4G, WiFi | TLS/TCP/IPV4 Or IPV6 | Taken care by IMS |
| | Secondary Notification Channel-WebSocket | LTE/4G, WiFi | WebSocket/TLS/TCP/ IPV4 or IPV6 | Yes, Auto-detected |
| | Media-Primary Channel | LTE/4G | SRTP/SRTCP over UDP/IPV4 or IPV6 | Yes |
| | | WiFi | RTP/RTCP over WebRTC (UDP or TLS) | Auto-detected |

A more detailed description of the types of connectivity interfaces listed in Tables 1 and 2 is provided with respect to FIGS. 3 through 6 below.

Figure 3:
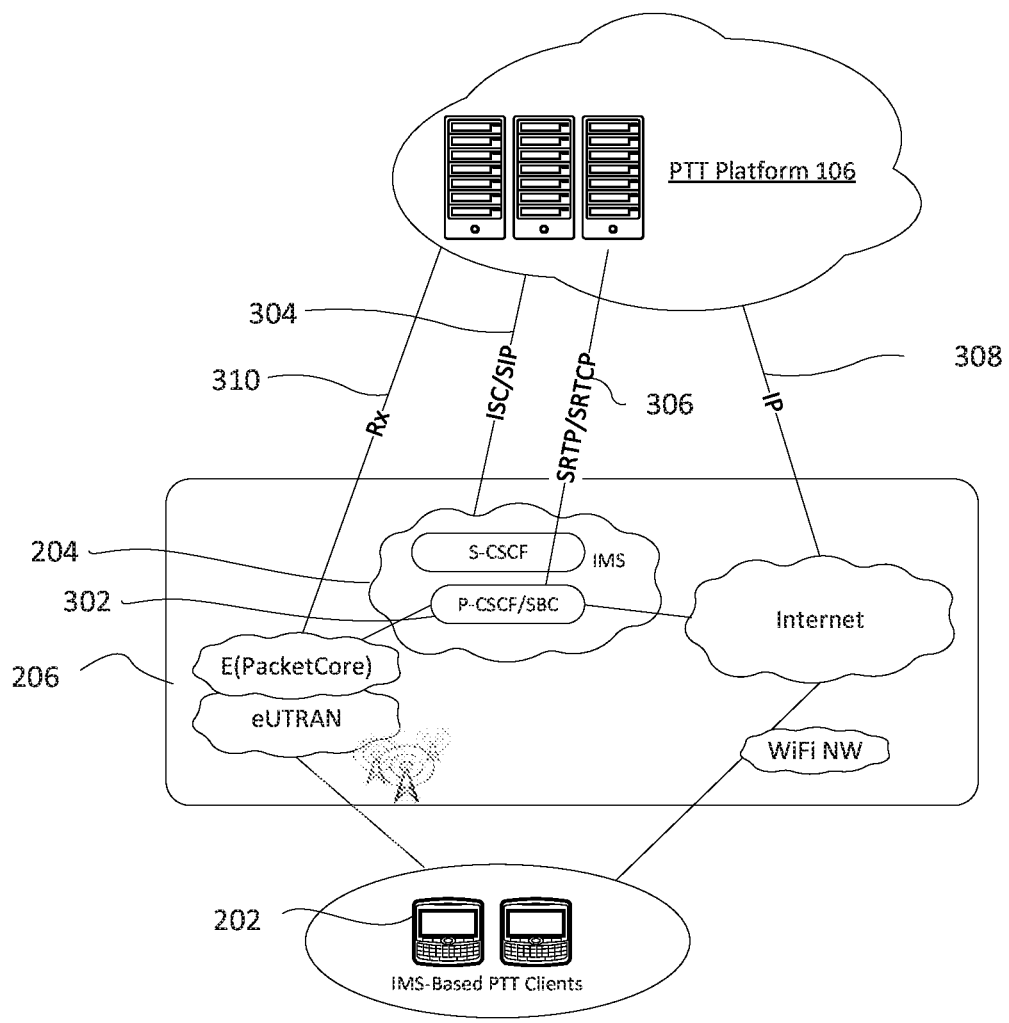

FIG. 3 illustrates a more detailed diagram of network connections between PTT platform 106 and IMS network 204 to support IMS-based PTT clients 202. Throughout the description an IMS-based PTT client may be used to reference a PTT client communication with a PTT platform over an IMS network. In some embodiments, PTT platform 106 supports IMS-based PTT clients 202 by acting as an application server to IMS network 204 and using an IMS service control (ISC) interface 304 for connectivity. Various IMS-based clients (e.g., PTT clients 202) may interact with IMS core 204/operator network 206 for activation and provisioning of the IMS-based client.

In an embodiment, ISC interface 304 includes a subscriber content charging function (SCCF), and PTT platform 106 uses ISC interface 304 to connect with IMS-based PTT clients 202. ISC interface 304 may be a SIP interface in an embodiment. For example, PTT platform 106 may use ISC/SIP interface 304 over IMS network 204 for PTT signaling between PTT servers and PTT clients 202 to provide PTT call sessions (e.g., PoC call sessions as described Open Mobile Alliance Ltd., "OMA PoC Control Plane," OMA-TS-PoC_ControlPlane-V2_0-20110802-A, 2 Aug. 2011; Open Mobile Alliance Ltd., "OMA PoC Document Management," OMA-TS-PoC_Document_Management-V2_0-20110802-A, 2 Aug. 2011; and Open Mobile Alliance Ltd., "PoC User Plane," OMA-TS-PoC_User-Plane-V2_0-20110802-A, 2 Aug. 2011 (collectively hereinafter "OMA PoC 2.0")). PTT clients 202 may utilize pre-established PTT sessions or on-demand PTT sessions as appropriate for PTT call setup. PTT platform 106 may further use SIP/IP signaling for message exchange with presence servers and/or resource list servers (RLS) for presence information. Throughout the description the format protocol1/protocol2 may be used to designate protocol1 over protocol2 signaling. For example, "SIP/IP" designates SIP over IP signaling. In an embodiment, PTT platform 106 supports TCP transport protocols, UDP transport protocols, or a combination thereof as an ISC interface between PTT client 202 and IMS core network 204.

As further illustrated by FIG. 3, secure real-time transport protocol (SRTP)/IP, secure real-time control protocol (SRTCP)/IP, media burst control protocol (MBCP) over STCP/IP, or a combination thereof (illustrated in FIG. 3 as interface 306) may be used for packets exchange between PTT platform 106 and session border controller (SBC) 302 of IMS network 204. In an embodiment, SBC 302 may be co-located with proxy-call session control function (P-CSCF) in operator network 206. SBC 302 may forward packets between media servers and PTT clients 202 for bearer traffic exchange of PTT call sessions. In an embodiment, the SRTP/SRTCP interface may utilize UDP as a transport protocol between PTT platform 106 and IMS network 204 although other transport protocols may be used as well.

PTT platform 106 may further include client data management interfaces 308. Client data management interfaces 308 may traverse over the Internet using extensible markup language (XML) configuration access protocol (XCAP)/hypertext transfer protocol (HTTP)/IP or representational state transfer (REST)/HTTP/IP interfaces between PTT platform 106 and PTT clients 202. These client data management interfaces 308 may allow for XCAP document management, affiliated groups information management, and the like. In some embodiments, client data management interfaces 308 are IMS independent interfaces, which may utilize HTTPS over TLS (TCP) transport protocols. Other transport protocols may be used as well in other embodiments.

As further illustrated by FIG. 3, PTT platform 106 includes a receive (Rx) interface 310 with policy and changing rules function (PCRF) 302. Rx interface 310 may be used to support one or more of the following features: network based quality of service (QoS) support, dynamically assigning priority for users or groups of users, and the like. Rx interface 310 may use Diameter as a base protocol, which may be implemented over TCP transport protocols. Other transport protocols may be used as well.

Figure 4:
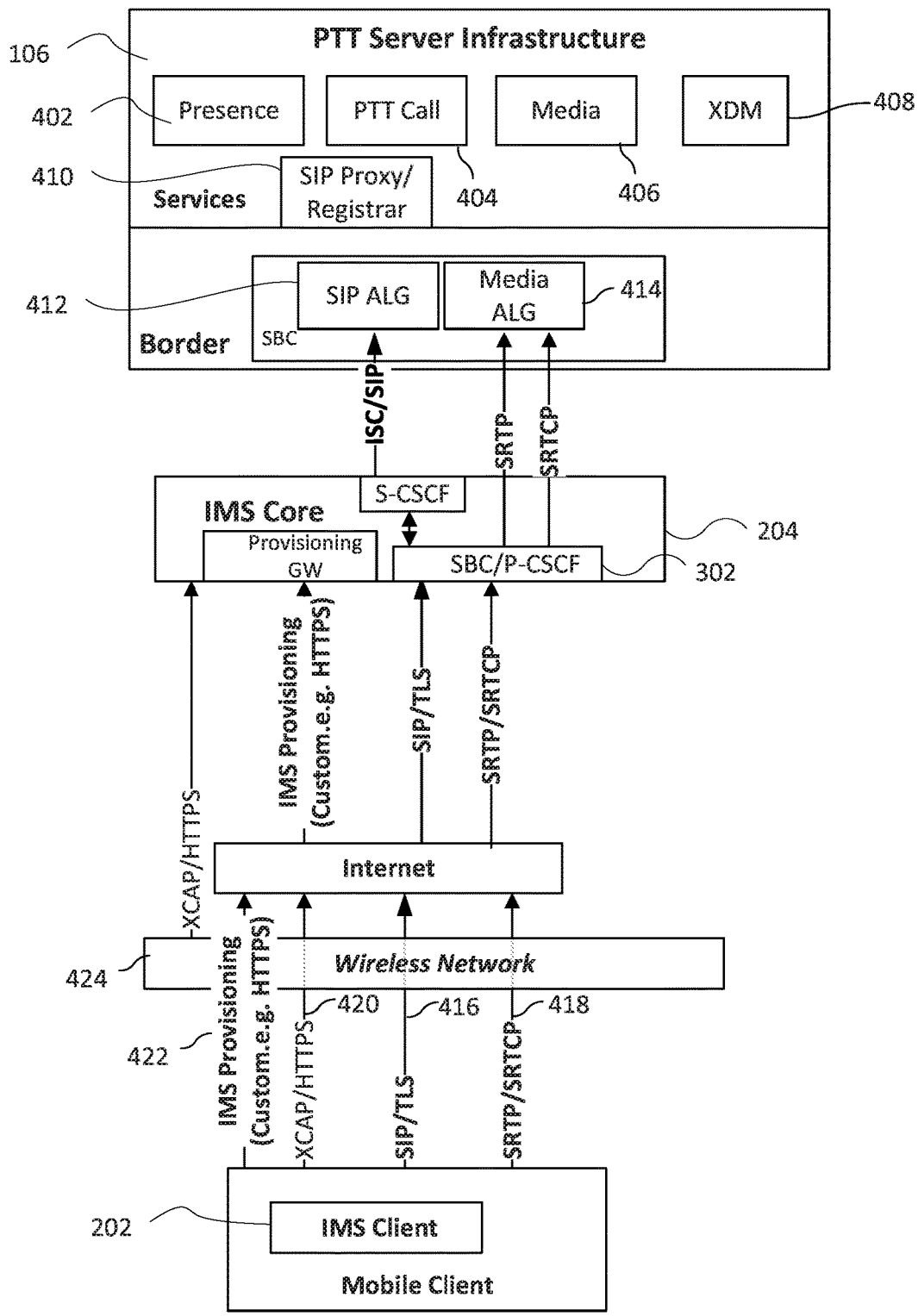

FIG. 4 illustrates a more detailed block diagram of IMS-based LTE interfaces and protocols between PTT platform 106 and an IMS-based PTT client 202. PTT platform 106 may include a plurality of servers, which may provide services to PTT client 202. In some embodiments, the servers are virtual service clusters encapsulated in containers and hosted on virtual machines of a cloud platform. PTT platform 106 may include a presence server 402, PTT call servers 404, media servers 406, extended markup language (XML) document manager (XDM) server 408, and SIP proxy/registrar servers 410. PTT platform 106 further includes border components, such as a SIP application level gateway (ALG) 412 and a media ALG 414. SIP ALG 412 may communicate with IMS network 204 over an ISC/SIP as described above, and media ALG 414 may communicate with IMS network 204 over SRTP/SRTCP interfaces as described above. SIP ALG 412 and media ALG 414 may be components of a SBC of PTT platform 106. Although FIG. 4 illustrates a particular combination of servers and gateways, and embodiment PTT platform may include any combination of the illustrated servers and/or gateways as well as other servers and/or gateways.

FIG. 4 further illustrates various interfaces between IMS-based PTT client 202 and IMS network 204. These interfaces may include SIP interface 416, SRTP/SRTCP interface 418, XCAP interface 420, and IMS provisioning interface 422, and these interfaces may be connected to IMS network 204 over the Internet and a wireless network 424. In some embodiments, wireless network 424 may include a cellular network (e.g., LTE/4G), a WiFi network, or the like. PTT client 202 may utilize SIP interface 416 to communicate with PTT platform 106 through IMS network 204 for PTT, presence, and other SIP signaling. In an embodiment, SIP interface 416 uses a TLS (e.g., TCP) transport protocol. However, an operator's actual transport interface (e.g., UDP or TCP) is selected based on a configuration (e.g., a supported transport interface) of IMS network 204, and SIP interface 416 may be adapted according to the configuration of IMS network 204. Application signaling (e.g., by servers in PTT platform 106) may be in accordance with one or more standards, such as, OMA PoC (e.g., OMA PoC 2.0), presence (e.g., as described in Open Mobile Alliance Ltd., "Presence SIMPLE Specification," OMA-TS-Presence_SIMPLE-V2_0-20120710-A, 10 Jul. 2012; Open Mobile Alliance Ltd., "Resource List Server (RLS) Specification," OMA-TS-Presence_SIMPLE_RLS-V1_0-20120710-A, 10 Jul. 2012; Open Mobile Alliance Ltd., "Presence XDM Specification," OMA-TS-Presence_SIMPLE_XDM-V2_0-20120710-A, 10 Jul. 2012; Open Mobile Alliance Ltd., "Resource List Server (RLS) XDM Specification," OMA-TS-Presence_SIMPLE_RLS_XDM-V2_0-20120710-A, 10 Jul. 2012 (collectively hereinafter "OMA Presence 2.0")), and XDM standards (e.g., as described in Open Mobile Alliance Ltd., "XML Document Management (XDM) Specification," OMA-TS-XDM_Core-V2_0-20120403-A, 3

Apr. 2012; Open Mobile Alliance Ltd., "Shared List XDM Specification," OMA-TS-XDM_Shared_List-V2_0-20120403-A, 3 Apr. 2012; Open Mobile Alliance Ltd., "Shared Group XDM Specification," OMA-TS-XDM_Shared_Group-V1_0-20120403-A, 3 Apr. 2012 (collectively hereinafter "OMA XDM 2.0")).

PTT client 202 may further use SRTP/SRTCP interface 418, as provided by PTT server 404 (e.g., a media server 406 of PTT call server 404) for carrying voice data. SRTP/SRTCP interface 418 may use UDP as a transport protocol, and may be forwarded without modification, by SBC 302, between PTT client 202 and PTT call server 404. In an embodiment, IMS network 204 may support web real-time communications (WebRTC) to transport SRTP/SRTCP packets over non-LTE networks (e.g., WiFi networks). In an embodiment based on the OMA PoC 2.0 standard, the floor control messages are carried over floor control-specific RTCP App messages, referred to as a media burst control protocol (MBCP). RTCP App messages may also be used for implementing predictive wakeup functions in PTT platform 106 (e.g., as described in U.S. Pat. No. 8,478,261, entitled "Predictive Wakeup for Push-To-Talk-Over-Cellular (PoC) Call Setup Optimizations," patented Jul. 2, 2013, which application is hereby incorporated by reference).

PTT client 202 may use XCAP interface 420 for XDM operations including document retrieval, contact management, group management, and the like. XCAP interface 420 may be provided by XDM Server 408. In an embodiment, XCAP interface 420 supports OMA XDM XCAP standards based requests and responses as defined in OMA XDM 2.0. Legacy PTT clients may use HTTP transport protocol for XCAP operations, and newer PTT clients may use HTTP or HTTPS transport protocols as desired based on a desired security.

PTT client 202 may further use an IMS provisioning interface 422 for provisioning messages with IMS network 204. IMS provisioning interface may be a custom, operator specific interface. For example, HTTPS transport protocol may be used by some operators. IMS provision interface 422 may be used to activate and provision PTT client 202.

Figure 5:
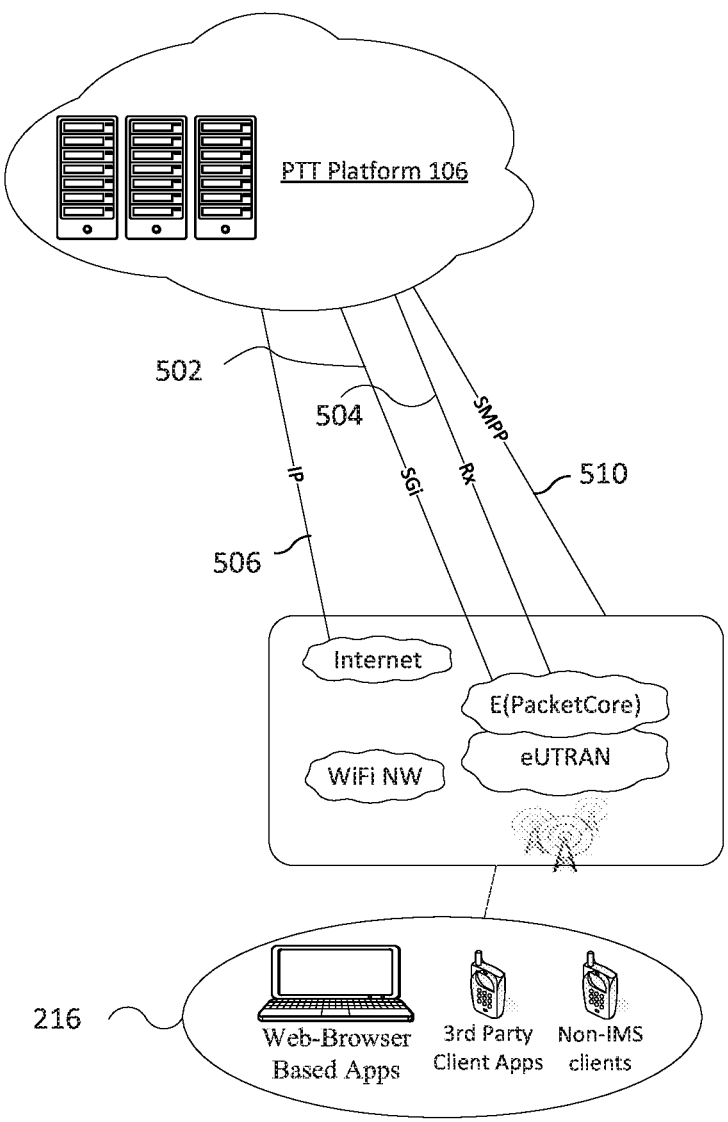

FIG. 5 illustrates various interfaces between PTT platform 106 and network components to support non-IMS clients 216. Such interfaces may include a SGi interface 502, an Rx interface 504, a short message peer-to-peer (SMPP) interface 506, and an IP interface 508. For example, SGi is a reference point between a packet data network (PDN) gateway and the PDN itself. The PDN may be an operator external public/private PDN, an intra-operator PDN (e.g., for provision of IMS services), or a combination thereof. Furthermore, SGi may correspond to Gi for 3GPP accesses. In an embodiment, PTT platform 106 may support TLS (TCP) transport protocols for communication between PTT clients 216 and PTT servers of PTT platform 106.

In some embodiments, SGi interface 502 includes a packet data network gateway (PGW)/gateway general packet radio service (GPRS) support node (GGSN) to transfer IP packets between non-IMS PTT clients 216 and servers of PTT platform 106. The types of traffic carried over SGi interface 502 may include PTT signaling between a PTT call server of PTT platform 106 and PTT clients 216 for PTT call sessions as described in the OMA PoC 2.0 standards. PTT clients 216 may utilize pre-established PTT sessions or on-demand PTT session as desired for PTT call set up. The types of traffic carried over SGi interface 502 may further include SIP/IP signaling messages between presence/RLS servers of PTT platform 106 and PTT client 216 for presence information. The types of traffic carried over SGi interface 502 may further include SRTP/IP, SRTCP/IP and MBCP over STCP/IP packets exchange with a SBC of PTT platform 106. The SBC of PTT platform 106 may forward the packets between media servers of PTT platform 106 and PTT client 216 for bearer traffic exchange for PTT call sessions. Furthermore, SGi interface 502 may utilize WebRTC as a transport protocol between PTT platform 106 and PTT client 216 over a wireless network (e.g., an LTE network). WebRTC standards allow utilization of various types of transport protocols to traverse through client side access network and firewall/NATs. Special or improved QoS can be applied to the traffic flowing through SGi interface 502 for PTT clients 216 over a LTE network. Other transport protocols may be used in other embodiments.

In some embodiments Rx interface 504 includes PCRF to support one or more of the following features: network based QoS support, dynamically assignment of priority for a set of users, dynamically assignment of priority for a user group. Rx interface 504 may use Diameter as a base protocol, which implemented over TCP transport protocol. Other transport protocols may be used in other embodiments.

In some embodiments, IP interface 506 may handle miscellaneous traffic between PTT client 216 and PTT platform 106 that does not traverse over SGi interface 502. For example, some traffic may not require LTE QoS, and such traffic may be handled over IP interface 506. Both IPV4 and IPV6 transport protocols may be supported by IP interface 506. Other transport protocols may be used in other embodiments.

PTT platform 106 may further maintain an SMPP interface 508 with an operator's short message server center (SMSC)/SMPP gateway. SMPP interface 508 may be provided by an XDM server of PTT platform 106 to receive activation command SMS's sent by the PTT clients 216 through a SMSC/SMPP gateway of an operator or a third Party SMMP provider who interworks with the operator. SMPP interface 508 may use SMPP v3.4. Other transport protocols may be used in other embodiments. Activation commands received over SMPP interface 508 may include a unique user ID generated by each PTT client 216, which is used for verifying the identity of a subscriber whose account is being activated.

Figure 6:
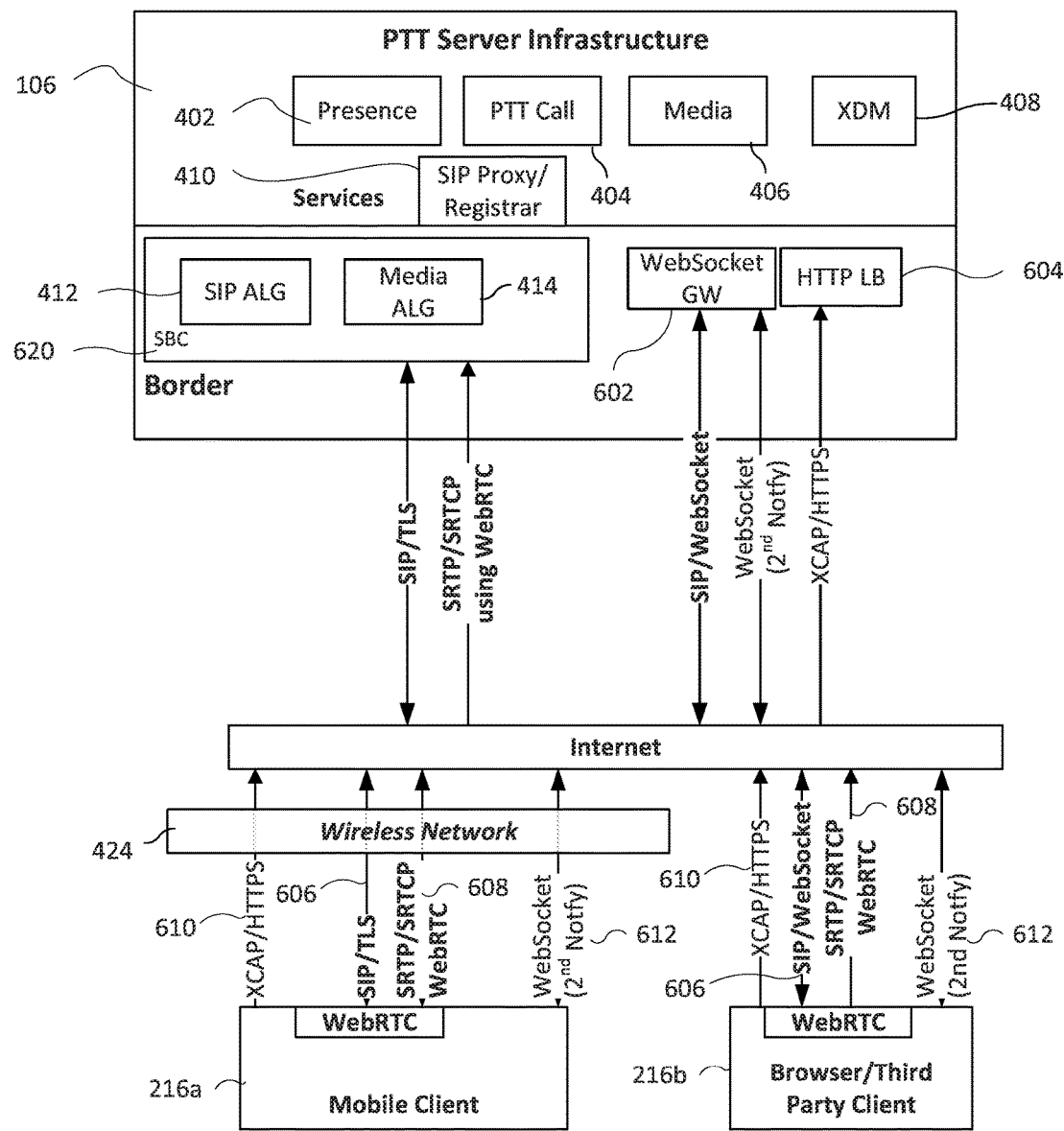

FIG. 6 illustrates a more detailed block diagram of non-IMS-based LTE interfaces and protocols between PTT platform 106 and non-IMS-based PTT clients 216. PTT platform 106 may include a plurality of servers, such as those described above with respect to FIG. 4. As further illustrated by FIG. 6, PTT platform 106 may include a WebSocket gateway 602 and an HTTP load balancer (LB) 604 for interfacing with non-IMS-based clients 216 (e.g., mobile clients 216a and browser/third party clients 216b). WebSocket gateway 602 provides transport level functionality to receive WebSocket connections from PTT clients using WebSocket as transport for SIP signaling or notification services. WebSocket gateway 602 forwards SIP packets to SIP Proxy.

Clients 216 may use SIP interface 606 to communicate with PTT platform 106 for PTT call, presence, and other SIP signaling. SIP interface 606 may use TLS (e.g., TCP) transport protocols for mobile clients 216a, and SIP interface 606 may use WebSocket over TLS transport protocols for browser/third party clients 216b. Application signaling for PTT platform 106 may be in accordance with OMA PoC, Presence, and XDM standards as defined in OMA PoC 2.0, OMA Presence 2.0 and OMA XDM 2.0.

PTT clients 216 may further use SRTP/SRTCP interface 608, as provided by PTT call server 404 (e.g., a media server 406 of PTT call server 404) for carrying voice data. SRTP/SRTCP interface 418 may use UDP as a transport protocol for voice data, and data may be forwarded without modification, by a SBC (e.g., SBC 620), between PTT clients 216 and PTT call server 404. In an embodiment, WebRTC may be used to transport SRTP/SRTCP packets over different types of networks (including non-LTE networks, such as, WiFi networks). By using WebRTC, SRTP/SRTCP packets may be transmitted regardless of the access transport type used by PTT clients 216 to access PTT platform 106. In an embodiment based on the OMA PoC 2.0 standard, the floor control messages are carried over special RTCP App messages, referred to as MBCP. RTCP App messages may also be used for implementing predictive wakeup functions in PTT platform 106 (e.g., as described in U.S. Pat. No. 8,478,261). Other transport protocols may be used in other embodiments.

PTT clients 216 may use XCAP interface 610 for XDM operations including document retrieval, contact management, group management, and the like. XCAP interface 610 may be provided by XDM Server 408. In an embodiment, XCAP interface 610 supports OMA XDM XCAP standards based requests and responses as defined in OMA XDM 2.0. Legacy PTT clients may use HTTP transport protocol for XCAP operations, and newer PTT clients may use HTTP or HTTPS transport protocols depending on a desired security level. Other transport protocols may be used in other embodiments.

Furthermore, third party APIs may be used to provide interfaces to allow control room/third party applications to easily access PTT platform 106. Benefits of using third party APIs may include client data management interfaces for XCAP/HTTP/IP or REST/HTTP/IP interfaces between PTT platform 106 and PTT clients 216. These client data management interfaces may allow for XCAP document management, affiliated groups information management, and the like. In some embodiments, client data management interfaces are IMS independent interfaces, which may utilize HTTPS over TLS (TCP) transport protocols. Other transport protocols may be used in other embodiments.

As further illustrated by FIG. 6, a secondary notification interface 612 may be used to provide alternate means of reaching PTT clients 216 under error or server fault conditions. This interface enables full geographical redundancy with carrier grade service availability to users of PTT platform 106. Secondary notification interface 612 may utilize WebSocket over TLS (TCP) as a transport protocol. Other transport protocols may be used in other embodiments for secondary notification interface 612.

In various embodiments, session information is provided to service clusters of PTT platform 106 in order to support sessions in a load balanced architecture model (e.g., a container-based platform described above). Various sessions may be transparent within a local region (e.g., contained to a single deployment site) and/or span across multiple geographically, device deployment sites. Deployment site may refer to data centers having host processors for hosting a virtual machines on which PTT platform 106 is deployed.

Some embodiment sessions are transparent only within a local region, such as within a datacenter, (referred to as sessions with intra-site scope). Sessions with intra-site scope may include transport level sessions, which cannot be easily ported across different sites. Interruptions to sessions with intra-site scope may require re-establishment of such sessions. Examples of sessions with intra-site scope include UDP sessions (e.g., used for media or SIP sessions), TCP sessions (e.g., used for SIP or WebSocket sessions), and the like. In some circumstances, sessions with intra-site scope cannot be ported from a physical server node on which the session has been established to a different server node within the same deployment site. For example, when a transport session utilizes a federal information processing standards (FIPS) mode of encryption, stringent key generation and management functions under FIPS encryption may not allow porting of sessions across different physical nodes.

A complete deployment site failure (e.g., datacenter failure) may result in the loss of transport level sessions, so an alternate mechanism to reach and notify PTT clients when such errors occur is desired for sessions with intra-site scope. When transport level session continuity is handled by intermediate network infrastructure, additional alternate notification mechanisms are not necessary. For example, in IMS-based architectures, transport level session management for SIP related sessions are handled by the IMS network by itself, and no additional notification mechanisms are required.

Regarding sessions that are transparent across different deployment sites (referred to as sessions with inter-site scope), various application layer sessions can be made available across geographical boundaries of different deployment sites using databases (e.g., distributed databases), for example. Thus, a geographical diverse, highly available PTT platform may be provided with increased redundancy and reduced service interruption to PTT users. Examples of sessions with inter-site scope include: client initiated presence SUBSCRIBE sessions, client initiated XDM SUBSCRIBE sessions, and the like.

Table 3 below provides example session recovery methods for different types of sessions established with different types of PTT clients according to some embodiments. Session recovery may include recovering a primary connection using a notification sent over a secondary connection as described below.

TABLE 3

Session Recovery Methods for Different Types of PTT Sessions

| Client Type | Access Network | Session | Purpose | Scope | Session Loss Impact(s) | Session Recovery Method |
|---|---|---|---|---|---|---|
| Mobile IMS Clients | All types of Access Networks | SIP INVITE | Pre-arranged PoC Session | In-site Service Cluster | In-time Pre-arranged PTT session over IMS or on-demand PTT session over IMS | Handled by IMS, no additional methods necessary |

TABLE 3-continued

Session Recovery Methods for Different Types of PTT Sessions

| Client Type | Access Network | Session | Purpose | Scope | Session Loss Impact(s) | Session Recovery Method |
|---|---|---|---|---|---|---|
| Mobile Non-IMS Clients | IPV6 LTE | SIP REGISTER over UDP | Client is Online and reachable | Multisite Service Cluster (Assuming UDP is unsolicited) | In-time Pre-arranged PTT session over IMS or on-demand PTT session over unsolicited UDP | Handled by UDP, no additional methods necessary |
| | WiFi or non-IPV6 LTE networks | SIP REGISTER over WebSocket/TLS | Client is online and reachable | In-site Service Cluster (Assuming TLS connections can be mirrored within site) | Notification or PoC Call cannot be reached. | Use of secondary notification method. For example, use a lightweight notification mechanism (e.g., messaging queue (MQ) telemetry transport (MQTT)) or SIP. As another example, use Open OS notification mechanisms (e.g., Android, IoS) |
| Third Party Clients or Web-Browser based Clients | Any type of access Network | SIP REGISTER over WebSocket/TLS | Client is online and reachable | In-site Service Cluster (Assuming TLS connections can be mirrored within site) | Notification or PoC Call can't be reached. | Use of secondary notification method. For example, use a lightweight notification mechanism (e.g., MQTT) or SIP. |

As indicated by Table 3 above, IMS networks may handle session recovery notification for mobile IMS-based clients without an additional secondary notification mechanism. However, additional secondary notification mechanisms may still be included in some embodiments if desired. As further indicated by Table 3 above, UDP handles session recovery for mobile non-IMS clients using an unsolicited UDP transport protocol and no additional secondary notification mechanisms are necessary. For example, a notification path can be recovered using IPV6 unsolicitated path.

However, as further indicated above, PTT clients (e.g., non-IMS-based clients or third party clients) connecting using SIP REGISTER sessions over WebSocket/TLS use one or more secondary notification methods to help recover a primary connection. For example, a lightweight notification mechanism (e.g., MQTT) or SIP may be used. As another example, Open OS notification mechanisms (e.g., Android, IoS) may be used as a secondary notification mechanism for such clients.

Figure 7:
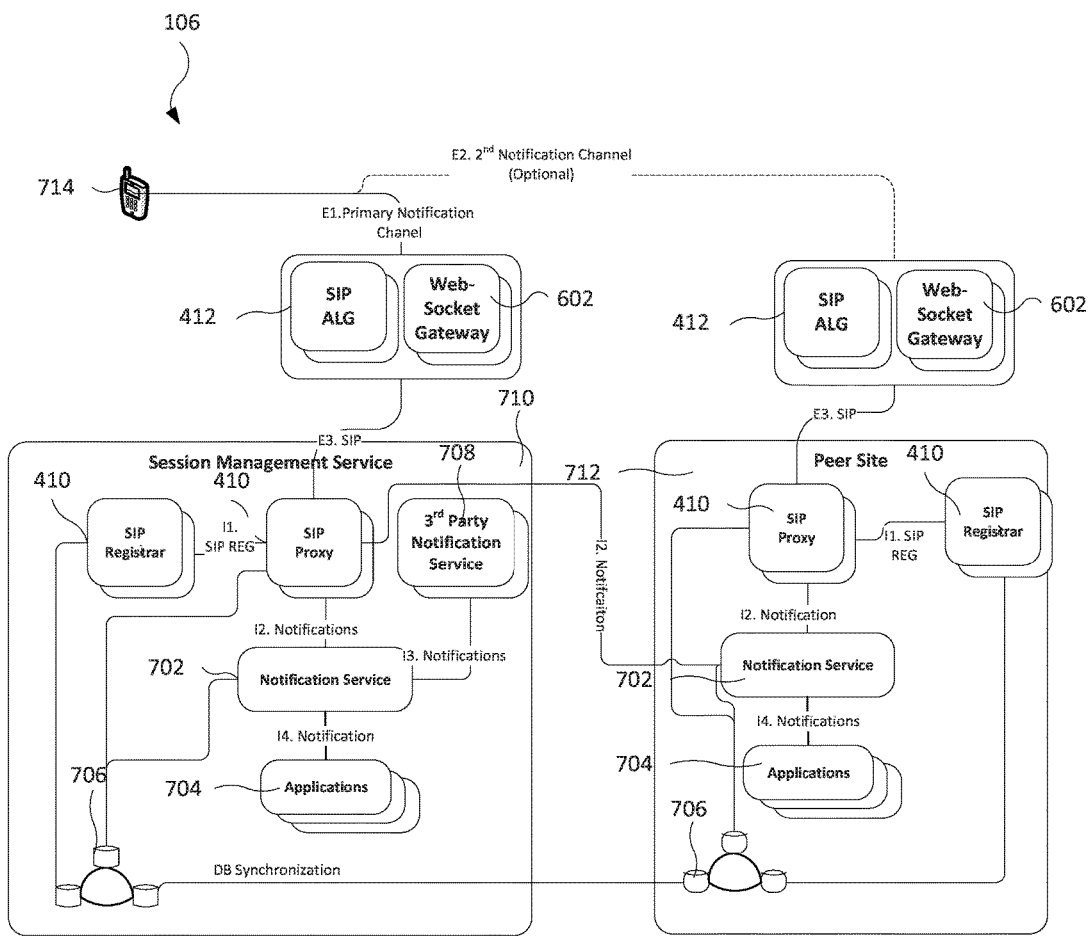
FIG. 7 illustrates a block diagram of server components for session management and notification in a PTT platform according to some embodiments.

FIG. 7 illustrates various components in PTT platform 106 for providing a session management and notification service. As illustrated by FIG. 7, PTT platform 106 includes SIP ALGs 412, WebSocket gateways 602, SIP proxies/SIP registrars 410, notification services 702, third party notification service(s) 708, and databases 706. In an embodiment, databases 706 may be one or more distributed databases although other types of storage mechanisms may be used as well in other embodiments. Components of the session management and notification service (e.g., SIP proxy/SIP registrar 410, notification service 702, and database 706) may be deployed at a first deployment site 710 and at a second geographically different deployment site 710. Deployment sites 710 and 712 may further include various applications 704 to provide services for users of PTT platform 106. A PTT client 714 (e.g., an IMS-based client or a non-IMS-based client) may maintain a primary notification channel connection with deployment site 710. PTT client 714 may optionally maintain a secondary notification channel with secondary deployment site 704, for example, in accordance with a connection type between PTT client 714 and PTT platform 106 as described in Table 3 above.

SIP ALG 412 provides SIP aware transport level functionality, which accepts UDP or TCP sessions from PTT client 714 directly or IMS core networks. SIP ALG may then forward the UDP/TCP sessions to SIP proxy 410 at a respective deployment site 710/712.

WebSocket gateway 602 provides transport level functionality to receive WebSocket connections when PTT client 714 uses WebSocket as a transport protocol for SIP signaling or notification service. WebSocket gateway 602 may forward SIP packets to SIP proxy 410 at a respective deployment site 710/712.

SIP proxy 410 provides a single point of contact at a deployment site 710/712 for SIP signaling from PTT client 714. SIP proxy 410 aggregates PTT client 714 destined SIP traffic from various SIP servers (e.g., a PTT call server, presence servers, and the like) over a TCP/UDP session. SIP proxy 410 may further distribute PTT client 714 originated SIP traffic to appropriate SIP servers (e.g., a PTT call server, presence servers, and the like). In some embodiments SIP proxy 410 may provide load balancing functionality by load balancing SIP traffic to different SIP server instances.

SIP registrar 410 authenticates PTT subscribers over an SIP interface. SIP registrar 410 authenticates PTT client 714 prior to accepting a registration request. After PTT client 714 is successfully registered, SIP registrar 410 stores the SIP registration information along with access transport type used for the SIP Session in a database 706 of a respective deployment site 710/712. SIP registrar 410 may also send third party SIP registration requests to other services that depend on registration (e.g., presence/RLS services).

In some situations (e.g., for non-IMS-based clients), SIP registrar 410 may also authenticate PTT client. For example, PTT client 714 may create and transmit a SIP REGISTER request to SIP proxy/SIP registrar 410 for SIP and PTT registration. SIP registrar 410 may respond with a SIP digest challenge to PTT client 714 in a SIP "401 Unauthorized" response. PTT client 714 may then create an appropriate SIP challenge response, which may be included in a SIP REGISTER request sent to SIP registrar 410 by PTT client 714. SIP registrar 410 verifies the response. If the response is valid, SIP registrar 410 accepts the registration. If the response is not valid (e.g., authentication failure), SIP registrar 410 rejects the registration and sends a SIP "403 Forbidden" response to PTT client 714. PTT client 714 and SIP registrar 410 may use a username and password exchanged at the time of client activation for SIP digest authentication.

In another embodiment (e.g., for IMS-based clients), SIP authentication is handled by an IMS core network (e.g., IMS core 204, see FIG. 3). In such embodiments, SIP registrar 410 functions as a registration information repository. For example, SIP registrar may receive third Party REGISTRATION transmissions from the IMS network and track registration status of various users (e.g., the online status of different users). SIP registrar 410 may store registration information (e.g., client type/access transport type/user IDs) of various PTT clients in database 706.

Notification service 702 may be available for various application services 704 such as presence, messaging, PTT calling services, and the like. Notification service 702 may be implemented in a dedicated server, such as a virtual server (e.g., encapsulated in a container and hosted on virtual machine running on a physical processor of a cloud platform), or the like. Notification service 702 may be used to decouple notification delivery as an independent service, which is deployed independently of various other services in PTT platform 106 (e.g., application servers, SIP proxy, SIP registrar, and the like). Thus, mechanisms to choose a correct transport type for notifications and fallback mechanisms can be implemented.

Notification service may use session information stored in databases 706 to select an appropriate transport protocol for delivering notifications to PTT client 714. In some embodiments databases may be synchronized across different deployment sites so notification services at each deployment site may have access to PTT client information of inter-site sessions. In some embodiments, notification service may select a transport type for delivering notifications in accordance with a client type/access transport type of PTT client 714. For example, IMS-based PTT clients may have a primary notification mechanism of SIP over IMS with no separate secondary notification mechanism; LTE based clients that utilize IP firewalls allowing unsolicited traffic may have a primary notification mechanism of SIP over a UDP session with not separate secondary notification mechanism; and all other types of clients may have SIP over a primary WebSocket session as a primary notification mechanism and a secondary SIP over a secondary WebSocket session as a secondary notification mechanism. Other secondary notification mechanisms may include a redundant SIP session established over WebSocket, TLS, TCP, UDP, or the like, a third party notification mechanism (e.g., Mobile OS notification mechanisms), a MQTT session, or a combination thereof as described in greater detail below. In such embodiments, the secondary notification session (e.g., secondary SIP over secondary WebSocket) may be used to notify PTT client 714 when the primary transport level session is not reachable (e.g., as a result of network, infrastructure, and/or server cluster failure(s)). Notification service 702 may optionally utilize third party notification services (e.g., notification services unrelated to the PTT platform) such as native notification mechanisms provided by Android or IOS; native SMS as a notification mechanism; or the like as a secondary or tertiary notification service. In other embodiments, notifications service 702 may select other notification mechanisms for the listed client types/access transport types and/or other client types/access transport types.

Table 4 below provides a description of some internal and external interfaces of a PTT call service according to an embodiment as illustrated by FIG. 7. An embodiment PTT call service may include any combination of the described interfaces as well as other interfaces.

TABLE 4

Interfaces of a PTT Call Service

| Interface | Description |
| --- | --- |
| E1. Primary Notification Channel | The interface through which notifications typically flow. Non-IMS-based PTT clients may establish a transport level session and register with session management service using SIP REGISTER to provide a primary notification channel. For IMS-based PTT clients, the primary notification channel may be achieved by third party SIP REGISTER received from an IMS core. |
| E2. Secondary Notification Channel | This is interface is provided for PTT clients that do not utilize IMS or unsolicited IP networks. PTT clients using IMS or unsolicitated IP networks may not be provided with a secondary notification channel. The secondary notification channel provides an alternate transport path to reach a PTT client when the primary notification channel is not available. |
| E3. SIP Interface | A standard SIP interface between border elements (e.g., SIP ALG or WebSocket GW) and SIP proxy server |
| I1. SIP REGISTER Interface | SIP proxy forwards SIP REGISTER transactions to SIP registrar through this interface. |
| I2. SIP Notifications | Notification services utilize this interface to forward any SIP messages for delivery to a PTT client. |
| I3. Third Party Notifications | Notification Service utilizes this interface when notification server decides to use third party notification services (e.g., when both primary and secondary notification services have failed or are otherwise not available) |

TABLE 4-continued

Interfaces of a PTT Call Service

| Interface | Description |
| --- | --- |
| I4. Notifications | Provides an application server to notification service interface. Application server may provide additional information to define delivery attempt characteristics such as QoS or time to live information. The delivery attempt characteristics may be used to select an appropriate notification delivery mechanism for a PTT client. |

Figure 8:
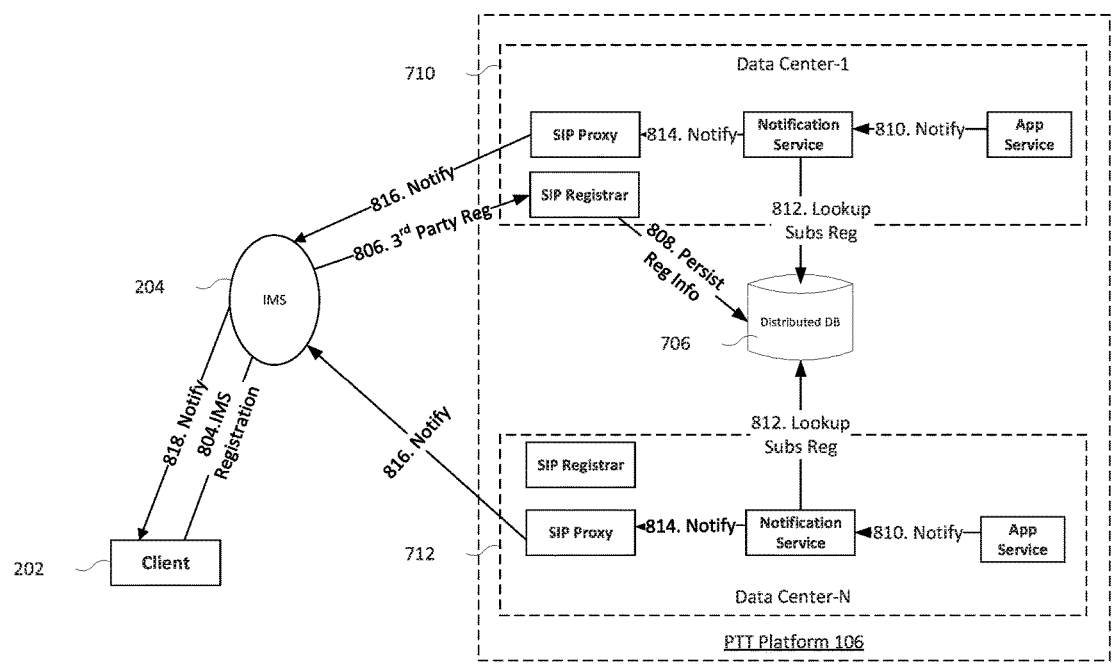
FIGS. 8 through 11 illustrate block diagrams of notification mechanisms between a PTT platform and PTT clients according to some embodiments.

FIG. 8 illustrates a service flow of session management in an embodiment PTT platform 106 for an IMS-based PTT client 202. In step 804, the IMS-based client 202 registers with IMS network 204 (e.g., by transmitting a SIP registration). Because IMS network 204 is separate from PTT platform 106, the SIP registration may be referred to as a third party SIP registration.

In step 806, IMS core network 204 forwards the third party SIP registration to PTT platform 106. For example, the third party SIP registration may be sent to PTT platform 106 over a standard IP multimedia service control (ISC) interface. When PTT platform 106 is deployed in a multi-site configuration (e.g., having multiple deployment sites), IMS core network 204 may use a load balancing policy, such as a geo-proximity policy to select an appropriate deployment site 710/712 to send the third party SIP registration. An embodiment geo-proximity policy selects a deployment site closest to PTT client (e.g., as determined by an IP address of the PTT client and as determined by a domain name search (DNS) on services of PTT platform 106). In such embodiments, a geo-proximity policy benefits PTT platform 106 as subscribers from a particular location will be load balanced to a same deployment site 702/704, which may allow re-use of cache data stored in nodes of PTT platform 106. In an embodiment, PTT platform 106 load balances the SIP registration to an available SIP registrar within a deployment site 710/712.

In step 808, the SIP registrar stores the third party SIP registration information in database 706, which registers PTT client 202. For example, the SIP register may store an access transport type of PTT client 202 in database 706. Registering PTT client 202 may result in indicating the subscriber is ONLINE and available to receive PoC application services.

When an application service needs to deliver a message, such as a text or presence update, to a registered IMS-based PTT client 202 the following process may be employed. In step 810, an application service initiates a message delivery request to a notification service. In step 812, the notification service looks up PTT client 202 in database 706 and determines the type of notification mechanism to be used, for example, based on a client type/access transport type of the PTT client 202. For example, FIG. 8 describes a notification process for IMS-based PTT client 202. Because PTT client 202 is IMS-based, the notification service may select any SIP proxy to send the notification. In such embodiments, notification service may transmit the notification to a local SIP proxy cluster to be transmitted to the PTT client in step 814. In step 816, the SIP proxy delivers the notification over IMS network 204 to PTT client 202. In step 818, IMS network 204 delivers the SIP message/notification to PTT Client 202. Although FIG. 8 illustrates two application services simultaneously sending notifications to PTT client 202, notifications may or may not be transmitted by application services at different deployment sites at any given time.

Figure 9:
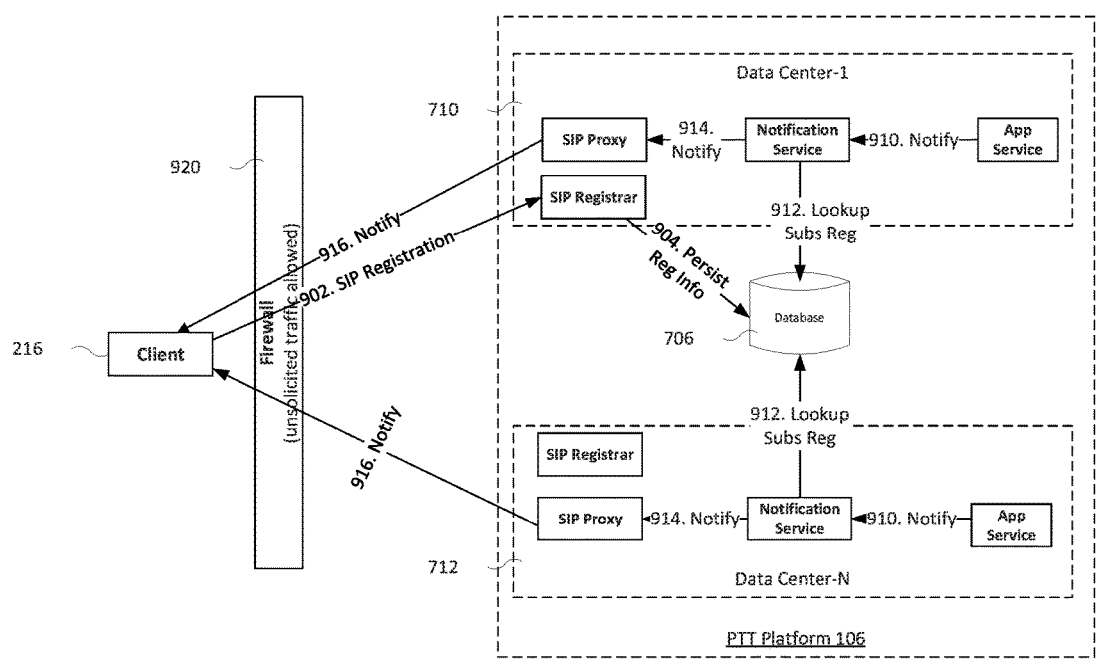

FIG. 9 illustrates a service flow of session management in an embodiment PTT platform 106 for a PTT client 216 that utilizes an unsolicited IP network connection to connect with PTT platform 106. In some embodiments, PTT client 216 may be LTE based and/or use an IPV6 unsolicited UDP transport protocol. An unsolicited UDP transport protocol may be used to refer to an embodiment transport protocol where an operator network's firewall 920 is configured to allow unsolicited traffic. For example, firewall 920 may allow traffic from a server to a mobile device (e.g., a mobile device running PTT client 216) without requiring the mobile device to initiate an IP connection with the server. In some embodiments, an unsolicited IP network typically uses a network configuration (e.g., as provided by a network operator) that is specific to IP address ranges of PTT servers to access PTT platform 106. This network configuration allows application services from any data center (e.g., deployments sites 710/712) to transmit IP/UDP packets to PTT client 216.

Session management for PTT client 216 may be provided as follows. In step 902, PTT client 216 registers with PTT platform 106, for example, by transmitting an SIP registration request. In an embodiment, PTT platform 106 load balances the SIP registration to an available SIP registrar at a deployment site 710/712. In step 904, the SIP registrar authenticates PTT client 216. Once authenticated, the SIP registrar stores the SIP registration information of PTT client 216 in database 706, which registers PTT client 216. Registering PTT client 216 may result in indicating the subscriber is ONLINE and available to receive PoC application services.

When an application service needs to deliver a message, such as a text or presence update, to a registered PTT client 216 the following process may be employed. In step 910, an application service initiates a message delivery request to a notification service. In step 912, the notification service looks up PTT client 216 in database and determines the type of notification mechanism to be used, for example, based on a client type/access transport type of PTT client 216. For example, FIG. 9 describes a notification process for PTT client 216, which uses an unsolicited IP network to access PTT platform 106. Because PTT client 216 is using an unsolicited IP network, the notification service may select any SIP proxy to send the notification. In such embodiments, notification service may transmit the notification to a local SIP proxy cluster for transmission to the PTT client in step 914. In step 916, the SIP proxy delivers the notification over the unsolicited IP network using an IPV6 UDP transport protocol.

Figure 10:
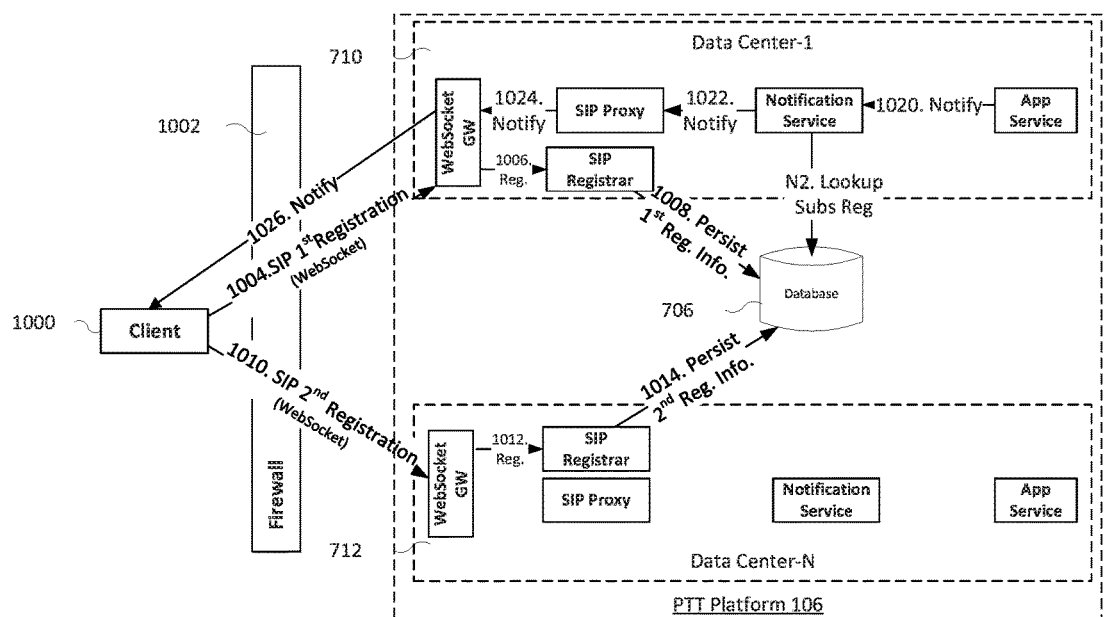

FIG. 10 illustrates a service flow of session management in an embodiment PTT platform 106 for a PTT client 1000 that utilizes any other type of network connection (e.g., other than an IMS-based or unsolicited IP network connection) to connect with PTT platform 106. For example, the operator's network firewall 1002 may allow a server to transmit messages to PTT client 1000 only if PTT client 1000 has initiated and kept an active transport session (e.g., UDP or TCP) with the specific server. Furthermore, PTT client 1000 may be a web browser based PTT client, a third party PTT client (e.g., a client provided by third party independent from a provider of PTT platform 106), a non-IMS clientor the like. Because of the configuration of firewall 1002 (e.g., unsolicited traffic is not allowed), only the border nodes that received the client transport sessions can only terminate IP packets to PTT client 1000, and not all servers (e.g., not all SIP proxies) in PTT platform 106 can directly transmit IP packets to PTT client 1000.

Session management for PTT client 1000 may be provided as follows. In step 1004, PTT client 216 registers with PTT platform 106, for example, by establishing a WebSocket connection with a WebSocket gateway. In an embodiment, PTT platform 106 transmits a WebSocket request, and PTT platform 106 load balances the WebSocket request to an available WebSocket gateway at a first deployment site 710. PTT client 1000 initiates an SIP REGISTER session over WebSocket. In step 1006, WebSocket gateway forwards the SIP REGISTER request to a local SIP at the first deployment site 710. In step 1008, SIP registrar authenticates PTT client 216. Once authenticated, the SIP registrar store the SIP registration information of PTT client 216 in database 706, and SIP registrar may further store information identifying the particular WebSocket gateway cluster that received the client connection in database 706.

In steps 1010-1014, PTT client 1000 may further establish a secondary notification channel (sometimes referred to a s a redundant notification channel) by establishing another WebSocket connection and a secondary SIP registration session at a second deployment site 712. Establishing the secondary notification channel may be done using a similar procedure as the primary notification channel described in steps 1004 to 1008 above. PTT client 1000 may implement logic to sure the primary and secondary WebSocket connections are not established at the same data centers. For example, PTT client 1000 may transmit a location of the primary WebSocket connection with the second WebSocket registration request to PTT platform 106. PTT client 1000 may further transmit an indication the registration request is a secondary WebSocket registration request to PTT platform 106. In another embodiment, the location of the primary WebSocket connection may be stored in database 706. When PTT platform 106 receives the second WebSocket registration request with the location of the primary connection, PTT platform 106 load balances the second WebSocket connection to a WebSocket gateway at a different deployment site than the primary WebSocket connection. The secondary notification channel may be used to recover a session when a connection with the primary notification channel fails. The SIP registrar may further store information identifying the WebSocket gateway maintaining the secondary notification channel in database 706.

When an application service needs to deliver a message, such as a text or presence update, to a registered PTT client 1000 the following process may be employed. In step 1020, an application service initiates a message delivery request to a notification service. In step 1022, the notification service looks up PTT client 216 in database and determines the type of notification mechanism to be used, for example, based on a client type/access transport type of PTT client 1000. For example, FIG. 10 describes a notification process for PTT client 1000 using a network connection that is not IMS-based and does not allow unsolicited traffic. Because PTT client 1000 is using this type of connection, the notification service instructs the SIP proxy to utilize a specific WebSocket gateway maintaining a primary connection with PTT client 1000 to send the notification. For example, in FIG. 10, the application service originating the notification is located in a same deployment site 710 as the WebSocket gateway with which PTT client 1000 maintains a primary connection. Thus, in step 1024, the notification service instructs the SIP proxy to forward the notification to the WebSocket gateway in deployment site 710. In step 1026, the WebSocket gateway then forwards the notification over the established WebSocket transport session with PTT client 1000.

Figure 11:
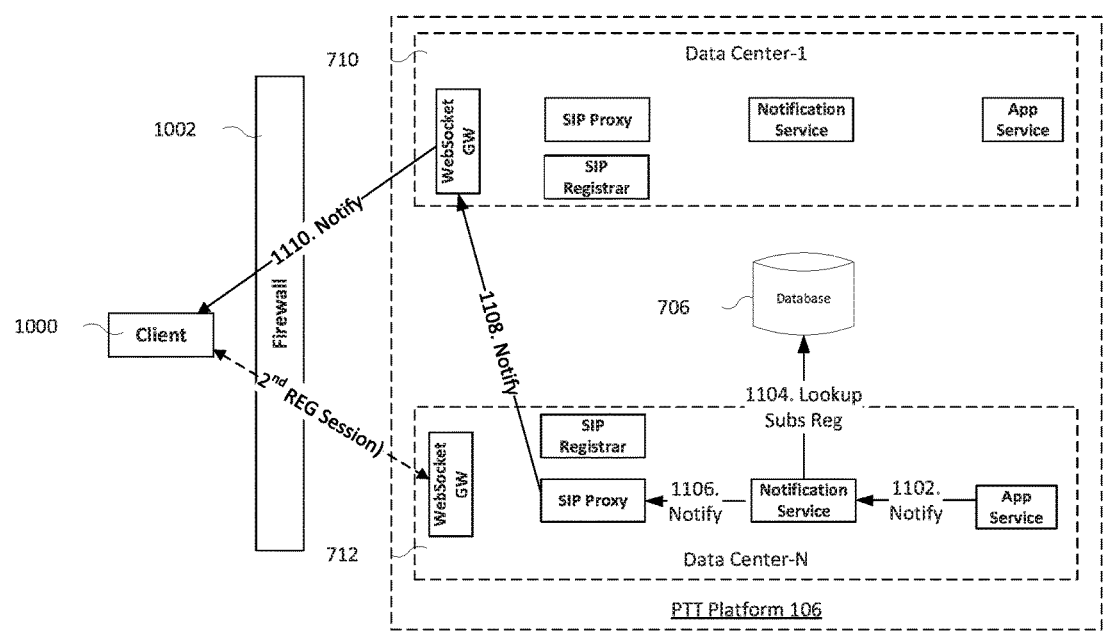

FIG. 11 illustrates another example where the application service originating the notification is a different deployment site 712 as deployment site 710 where the WebSocket gateway maintaining a connection with PTT client 1000 is located. In step 1102, the notification service instructs the SIP proxy in deployment site 712 to forward the notification to the WebSocket gateway in deployment site 710. In step 1104, the WebSocket gateway in deployment site 710 then forwards the notification over the established WebSocket session with PTT client 1000.

In various embodiments, most in-site node failure (e.g., failure of a container in a service cluster) does not impact the application server (e.g., the virtual application server encapsulated in containers of a service cluster). An embodiment PTT platform may include built-in fault recovery mechanisms. For example, transport level sessions may be made highly available within deployment site using real-time session replication for each service cluster in PTT platform 106 for failed containers. Thus, the loss of a container may not impact PTT clients connected to the PTT platform. However, security protocols may provide exceptions where real-time replication is disallowed. For example, FIPS transport sessions may provide such an exception. In these situations, it may be desirable to deliberately re-establish sessions even when a specific transport session node fails.

Figure 12:
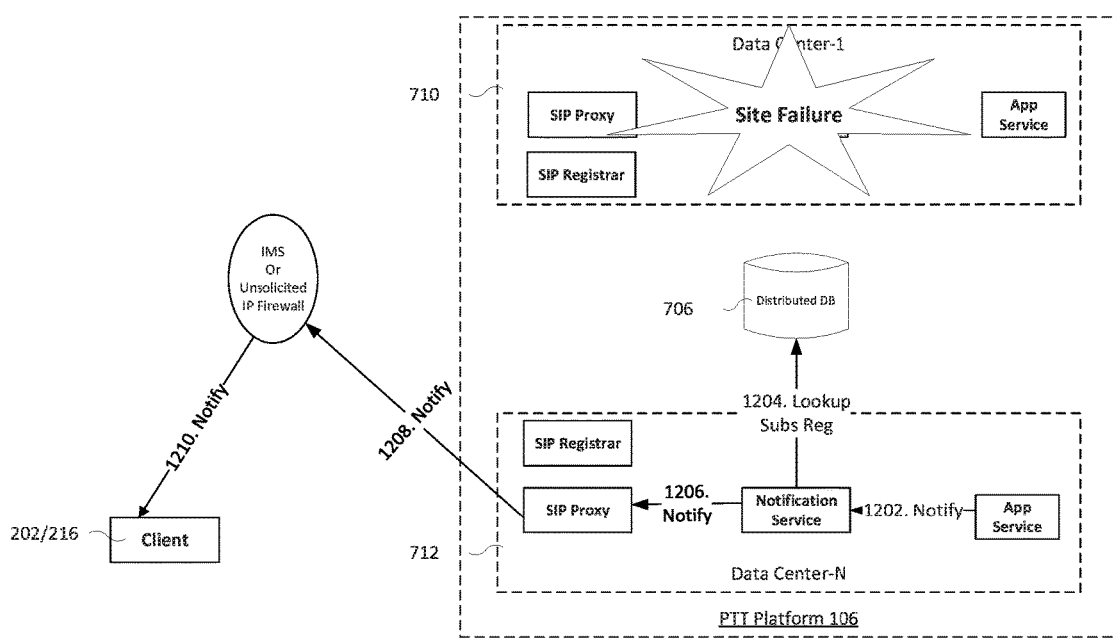
FIGS. 12 through 16 illustrate block diagrams of session recovery and redundant notification mechanisms between a PTT platform and PTT clients according to some embodiments.

FIG. 12 illustrates recovery mechanisms for IMS-based clients 202 and/or PTT clients 216 connecting to the PTT platform using an unsolicited IP network connection. Recovery mechanisms may be initiated when a deployment site (e.g., deployment site 710) maintaining a primary connection with the PTT client 202/216 fails. When PTT clients 202/216 are utilizing an IMS access network or an unsolicited IP network, failure of a deployment site may not impact session mobility as any deployment site can communication with the PTT client 202/216.

Session recovery may begin in step 1202 when an application service at an online site (e.g., deployment site 712) initiates a message delivery request to a notification service. In step 1204, the notification service looks up PTT client 202/216 in database 706 to determine the type of notification mechanism to be used, for example, based on a client type/access transport type of PTT client 202/216. Because PTT client 202/216 is using an IMS network or an unsolicited IP network, the notification service may select any SIP proxy to send the notification to PTT client 202/216. In such embodiments, notification service may transmit the notification to a local SIP proxy cluster for transmission to PTT client 202/216 in step 1206. In step 1208, the SIP proxy delivers the notification over the IMS network or the unsolicited IP network using an IPV6 UDP transport protocol as described above, and the IMS network/unsolicited IP network delivers the notification to PTT client 202/206 in step 1210.

Figure 13:
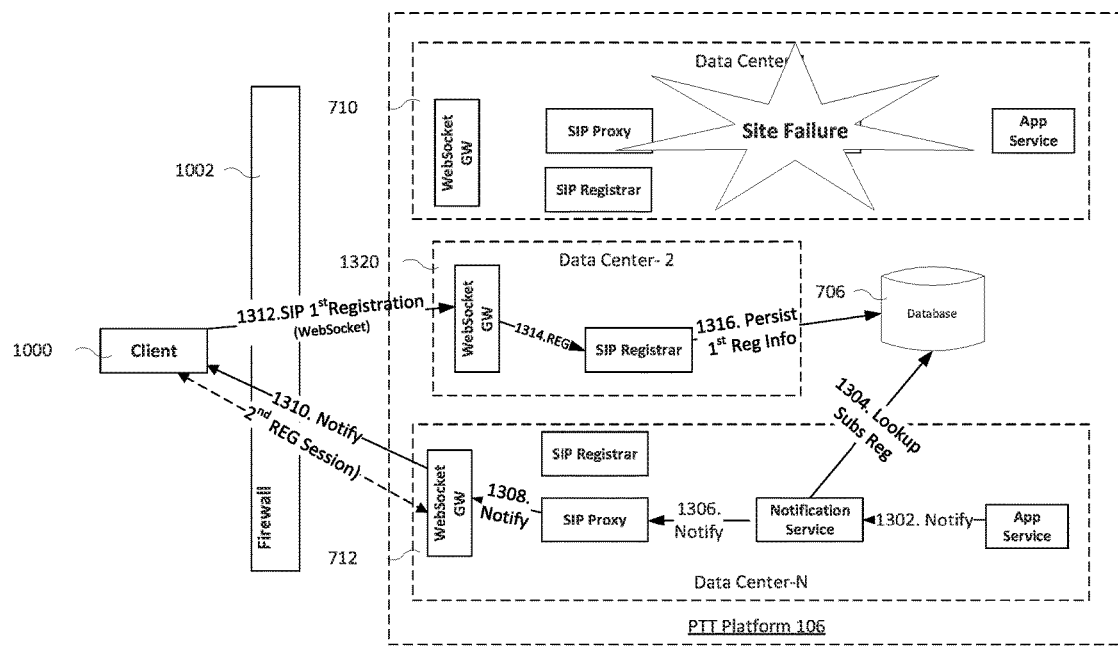

FIG. 13 illustrates recovery mechanisms for PTT clients 1000, which do not use an IMS-based or unsolicited IP network connection to communicate with PTT platform 106. Recovery mechanisms may be initiated when a deployment site (e.g., deployment site 710) maintaining a primary connection with the PTT client 1000 fails. For example, PTT client 1000 may be using a network connection where unsolicited traffic is not allowed, and PTT client 1000 may use WebSocket to communicate with the PTT platform as described above. Because the network connection does not allow unsolicited traffic, any notification to PTT client 1000 needs to follow an established transport session path. Thus, transport level sessions (e.g., TCP, TLS, or WebSocket sessions) cannot be recovered by another deployment site (e.g., deployment site 712) seamlessly. In such embodiments, the notification service uses the secondary notification channel to reach PTT client 1000 and delivery notifications when deployment site 710 fails. The notification service may inform PTT client 1000 its primary notification channel has been disrupted and request PTT client 1000 to re-establish a primary notification channel with PTT platform 106.

FIG. 13 illustrates a flow for delivering a message to PTT client 1000, which maintains a primary notification channel with a WebSocket gateway of a failed deployment site 710. In step 1302, an application service at an active deployment site 712 initiates a message delivery request to a notification service. In step 1304, the notification service looks up PTT client 1000 in database 706 to determine the type of notification mechanism to be used, for example, based on a client type/access transport type of PTT client 1000 and where the primary notification channel with PTT client 1000 is located. In FIG. 13, the notification service determines the WebSocket gateway maintaining a primary notification channel with PTT client 1000 is not reachable because deployment site 710 has failed. Thus, the notification service instructs the SIP proxy to utilize a secondary notification service to deliver the notification, and the SIP proxy transmits the notification using the secondary notification channel's WebSocket gateway in step 1308. In step 1310, the SIP proxy transmits the notification over the secondary notification channel to PTT client 1000.

An indication of primary channel unavailability may also be provided in the notification to trigger PTT client 1000 to re re-establish its primary session. As further illustrated by FIG. 13, PTT client 1000 may re-establish its primary WebSocket session based on the indication of primary channel unavailability in steps 1312, 1314, and 1316. Re-establishing the primary notification channel may follow a similar procedure as described above with respect to steps 1004, 1006, and 1008 in FIG. 10. The primary notification channel re-establishment request may be load balanced by PTT platform 106 to an available data center (e.g., deployment site 1320) and registration may be processed as described above.

Figure 14:
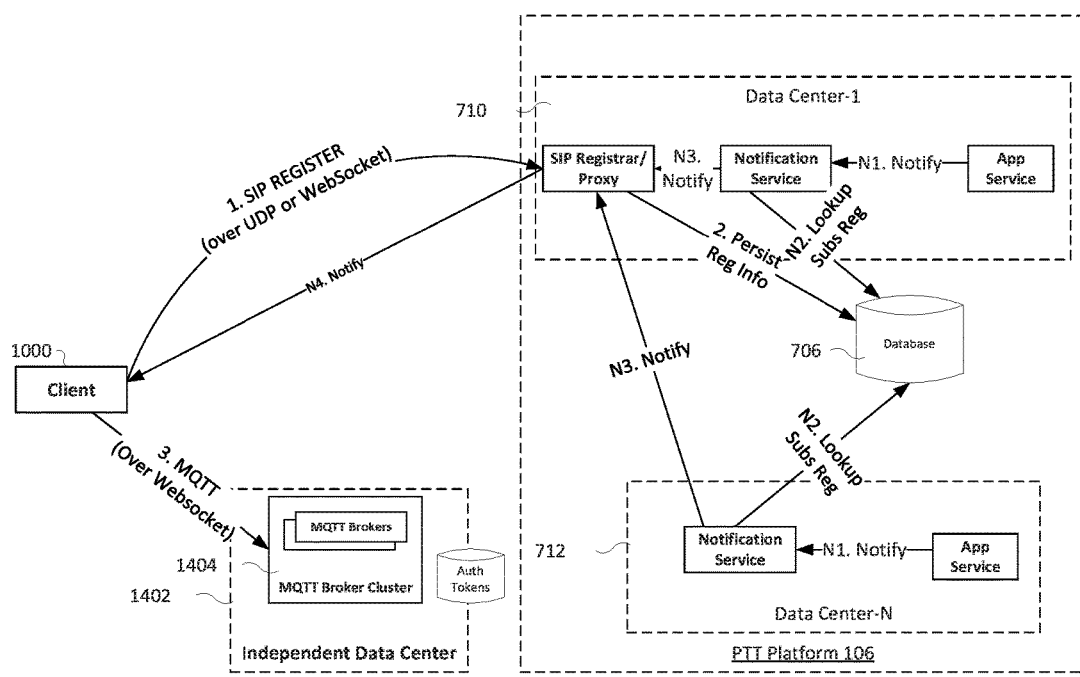
Figure 15:
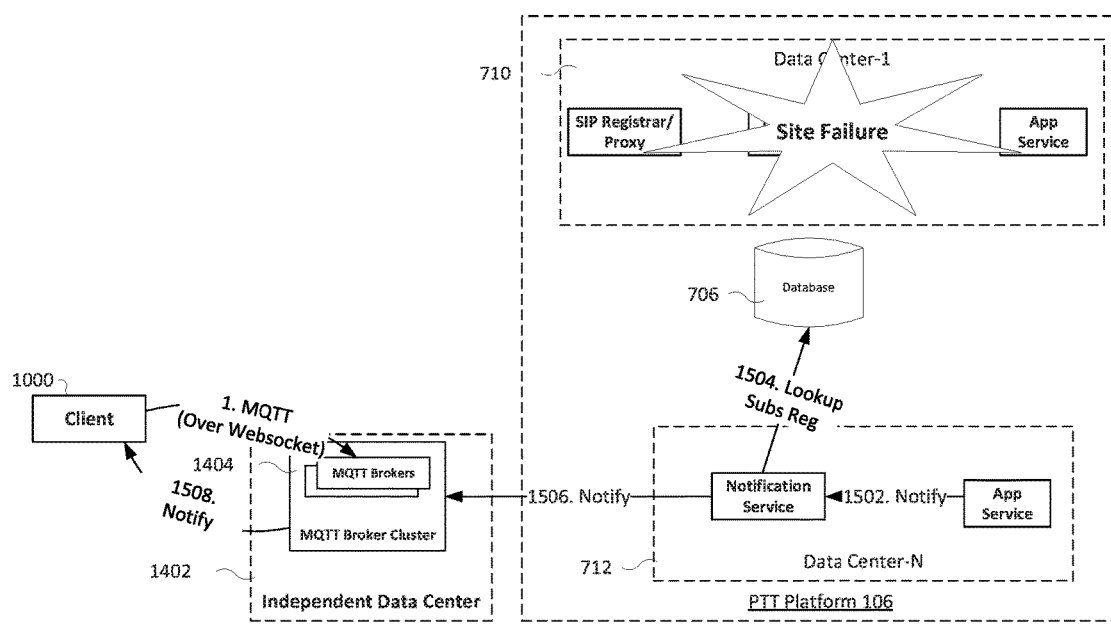

FIG. 13 illustrates a target application server (e.g., server attempting to communicate with PTT client 1000) and the WebSocket gateway having a secondary notification channel as being co-located in a same deployment site 712. In another embodiment, session recovery may be performed using a redundant notification service at a third party deployment site as illustrated by FIGS. 14 and 15. In FIGS. 14 and 15, PTT client 1000 may not use an IMS-based connection or a connection that allows unsolicited IP traffic to communicate with PTT platform 106. In other embodiments, an IMS-based PTT client or a client communicating with PTT platform 106 with an unsolicited IP connection may maintain a secondary notification channel in an independent data center for improved resiliency. The redundant notification channel provided by the independent data center may be in lieu of or in addition to a secondary notification channel using a WebSocket gateway as described above. In such embodiments, a redundant notification mechanism is provided by a server that is deployed in separate data center than where a target application service is deployed. For example, in FIG. 14, a redundant notification mechanism is provided by a MQTT broker cluster deployed at a third party data center 1402 deployed by a different service provider (e.g., Amazon Web Services™ (AWS), and the like) than a provider of PTT platform 106. Thus, failure of any data center in PTT platform 106 does not affect the redundant notification path through the third party deployment site, and system resiliency may be increased to handle any number of simultaneous data center failures in which target applications are deployed.

As illustrated by FIG. 14, PTT client 1000 may register and maintain a primary notification channel with a deployment site 710 of PTT platform 106 (e.g., as described above with respect to FIG. 10). PTT client 1000 may also maintain a secondary notification channel with a server 1404 (e.g., a MQTT broker cluster) at third party data center 1402. Server 1404 may have no relationship with services provided by PTT platform 106. In some embodiments, the secondary notification channel may use MQTT as a transport protocol for the redundant notification. Other types of session protocols (e.g., protocols using SIP) may be used in other embodiments, for example, based on the configuration of the third party deployment site.

FIG. 15 illustrates a flow diagram for delivering a message to PTT client 1000, which maintains a primary notification channel with a WebSocket gateway of a failed deployment site 710. In step 1502, an application service at an active deployment site 712 initiates a message delivery request to a notification service. In step 1504, the notification service looks up PTT client 1000 in database 706 to determine the type of notification mechanism to be used, for example, based on a client type/access transport type of PTT client 1000. The notification service may further use database 706 to determine locations (e.g., WebSocket gateway instances) of a primary secondary notification channel between PTT client 1000 and PTT platform 106. In FIG. 15, the notification service determines the WebSocket gateway maintaining a primary notification channel with PTT client 1000 is not reachable. Thus, the notification service uses a secondary notification service to deliver the notification. The notification service may determine the location/type of secondary notification service from database 706. In step 1506, the notification service the forwards the notification to the third party server 1404, which maintains a secondary notification channel with PTT client 1000. In step 1508, third party server 1404 sends the notification to PTT client 1000. An indication of primary channel unavailability may also be provided in the notification to trigger PTT client 1000 to re re-establish its primary session.

Figure 16:
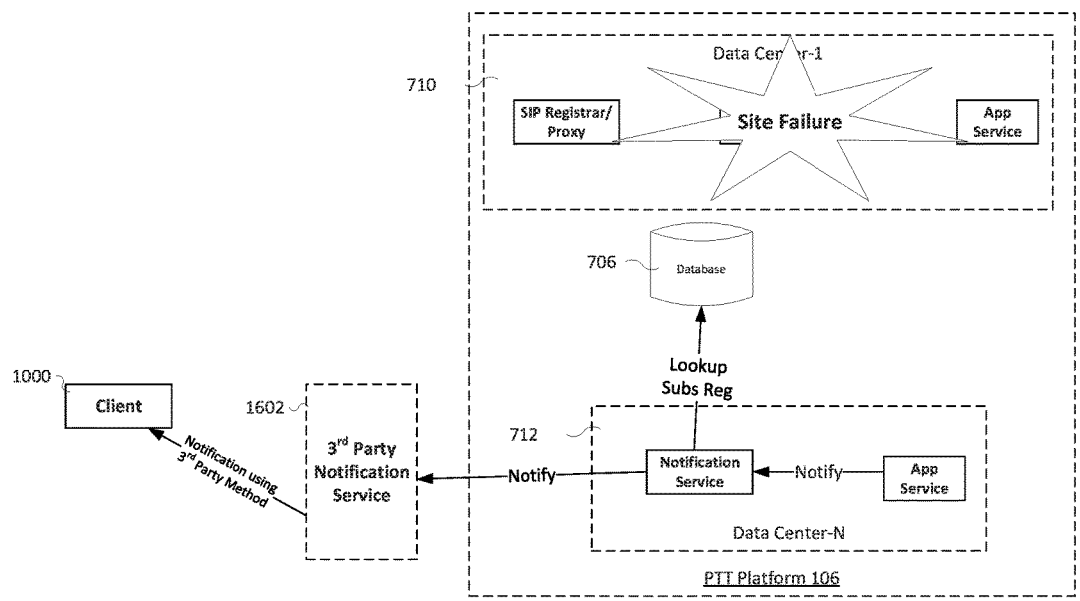

FIGS. 14 and 15 illustrate redundant notification channel provided a third party notification mechanism provided by a server at a third party deployment site. In another embodiment, the redundant notification may be provided by a third party notification mechanism provided by a generic, mobile open operating system (OS) platform-specific notification service 1602, such as Apple Notification Service, Google Notification Service, or the like as illustrated by FIG. 16. In FIG. 16, PTT client 1000 does not use an IMS-based connection or a connection that allows unsolicited IP traffic to communicate with PTT platform 106. In other embodiments, an IMS-based PTT client or a client communicating with PTT platform 106 with an unsolicited IP connection may maintain a secondary notification channel using a third party notification mechanism for improved resiliency. The third party notification mechanism may be in lieu of or in addition to a secondary notification channel using a redundant notification mechanism as described above. Because the notification service is provided by a third party (e.g., independent from PTT platform 106), the third party notification service may be running in a separate data center than deployment sites running various services provided by PTT platform 106. The redundant notification path may be used when a primary notification path with PTT client 1000 is not available or failed. Transmitting a notification to PTT client 1000 when a primary notification channel fails may be similar to that described above with respect to FIGS. 13 and 15 using a third party notification mechanism, such as, a mobile OS platform-specific notification service 1602. An indication of primary channel unavailability may also be provided in the notification to trigger PTT client 1000 to re re-establish its primary session.

Figure 17:
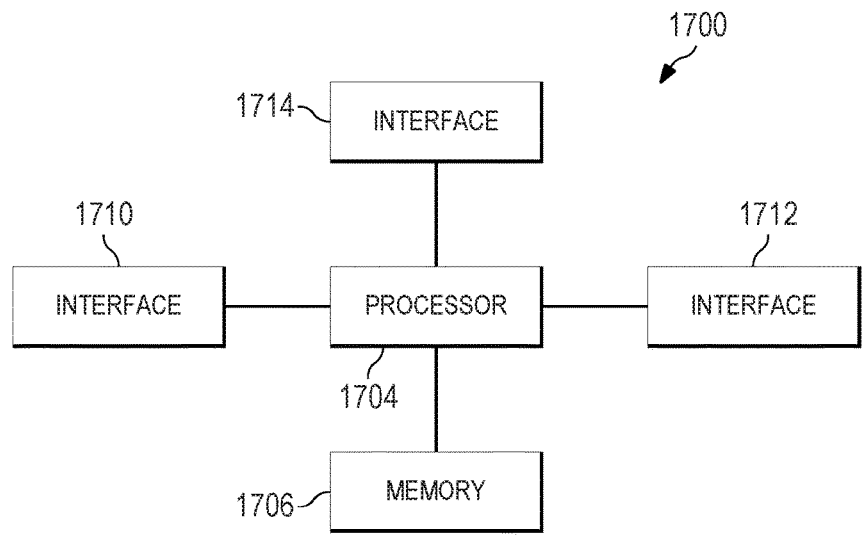
FIG. 17 illustrates a diagram of an embodiment processing system.

FIG. 17 illustrates a block diagram of an embodiment processing system 1700 for performing methods described herein, which may be installed in a host device. As shown, the processing system 1700 includes a processor 1704, a memory 1706, and interfaces 1710-1714, which may (or may not) be arranged as shown in FIG. 17. The processor 1704 may be any component or collection of components adapted to perform computations and/or other processing related tasks, and the memory 1706 may be any component or collection of components adapted to store programming and/or instructions for execution by the processor 1704. In an embodiment, the memory 1706 includes a non-transitory computer readable medium. The interfaces 1710, 1712, 1714 may be any component or collection of components that allow the processing system 1700 to communicate with other devices/components and/or a user. For example, one or more of the interfaces 1710, 1712, 1714 may be adapted to communicate data, control, or management messages from the processor 1704 to applications installed on the host device and/or a remote device. As another example, one or more of the interfaces 1710, 1712, 1714 may be adapted to allow a user or user device (e.g., personal computer (PC), etc.) to interact/communicate with the processing system 1700. The processing system 1700 may include additional components not depicted in FIG. 17, such as long term storage (e.g., non-volatile memory, etc.).

In some embodiments, the processing system 1700 is included in a network device that is accessing, or part otherwise of, a telecommunications network. In one example, the processing system 1700 is in a network-side device in a wireless or wireline telecommunications network, such as a base station, a relay station, a scheduler, a controller, a gateway, a router, an applications server, or any other device in the telecommunications network. In other embodiments, the processing system 1700 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 18:
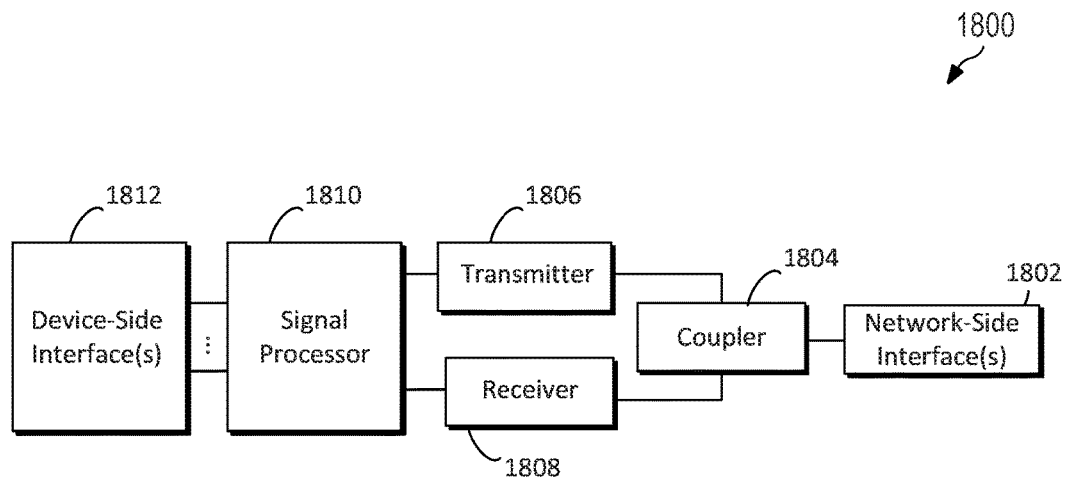
FIG. 18 illustrates a diagram of an embodiment transceiver.

In some embodiments, one or more of the interfaces 1710, 1712, 1714 connects the processing system 1700 to a transceiver adapted to transmit and receive signaling over the telecommunications network. FIG. 18 illustrates a block diagram of a transceiver 1800 adapted to transmit and receive signaling over a telecommunications network. The transceiver 1800 may be installed in a host device. As shown, the transceiver 1800 comprises a network-side interface 1802, a coupler 1804, a transmitter 1806, a receiver 1808, a signal processor 1810, and a device-side interface 1812. The network-side interface 1802 may include any component or collection of components adapted to transmit or receive signaling over a wireless or wireline telecommunications network. The coupler 1804 may include any component or collection of components adapted to facilitate bi-directional communication over the network-side interface 1802. The transmitter 1806 may include any component or collection of components (e.g., up-converter, power amplifier, etc.) adapted to convert a baseband signal into a modulated carrier signal suitable for transmission over the network-side interface 1802. The receiver 1808 may include any component or collection of components (e.g., down-converter, low noise amplifier, etc.) adapted to convert a carrier signal received over the network-side interface 1802 into a baseband signal. The signal processor 1810 may include any component or collection of components adapted to convert a baseband signal into a data signal suitable for communication over the device-side interface(s) 1812, or vice-versa. The device-side interface(s) 1812 may include any component or collection of components adapted to communicate data-signals between the signal processor 1810 and components within the host device (e.g., the processing system 1700, local area network (LAN) ports, etc.).

The transceiver 1800 may transmit and receive signaling over any type of communications medium. In some embodiments, the transceiver 1800 transmits and receives signaling over a wireless medium. For example, the transceiver 1800 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1802 comprises one or more antenna/radiating elements. For example, the network-side interface 1802 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1200 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

In accordance with an embodiment, a method includes receiving, by a notification service running on a processor, a notification from a first component of a push-to-talk (PTT) platform. The notification is for transmission to a PTT client. The method further includes determining, by the notification service, an access transport type used by the PTT client to communicate with the PTT platform, and selecting, by the notification service, a second component to transmit the notification to the PTT client. Selecting the second component is in accordance with the access transport type used by the PTT client. The method further includes transmitting, by the notification service, the notification to the second component. Determining the access transport type of the PTT client includes looking up the PTT client in a database.

The embodiment method further includes storing, by a session initiation protocol (SIP) registrar running on a processor, the access transport type of the PTT client in the database when the PTT client registers with the PTT platform.

In an embodiment method, the access transport type used by the PTT client is an internet protocol (IP) multimedia subsystem (IMS) network, and selecting the second component includes selecting a session initiation protocol (SIP) proxy at a same deployment site as the first component to transmit the notification to the PTT client over the IMS network.

In an embodiment method, the access transport type used by the PTT client is an unsolicited internet protocol (IP) network connection, and wherein selecting the second component includes selecting a session initiation protocol (SIP) proxy at a same deployment site as the first component to transmit the notification to the PTT client using a user datagram (UDP) transport protocol.

In an embodiment method, the access transport type used by the PTT client is not over an IMS network, and the access transport type used by the PTT client does not allow unsolicited internet protocol (IP) traffic. In this embodiment, selecting the second component includes selecting a first gateway maintaining a first notification channel with the PTT client to transmit the notification to the PTT client. In an embodiment method, the first gateway is located at a same deployment site of the PTT platform or a different deployment site of the PTT platform as the first component. In an embodiment method, a primary notification channel between the PTT client and a second gateway of the PTT platform is unreachable, and the first notification channel is a redundant notification channel between the PTT client and the first gateway. The embodiment method further includes including an indication the primary notification channel is unreachable in the notification. In an embodiment method, the first gateway is deployed as part of the PTT platform, and the first gateway is located at a different deployment site of the PTT platform than the second gateway. In an embodiment method, the first gateway is deployed at a third party deployment site independent from the PTT platform. An embodiment method further includes transmitting the notification to the PTT client using a mobile operating system (OS) platform-specific notification service. An embodiment method further includes transmitting the notification to the PTT client using messaging queue telemetry transport (MQTT) as a transport protocol.

In an embodiment method, the access transport type used by the PTT client is an internet protocol (IP) multimedia subsystem (IMS) network or an unsolicited internet protocol (IP) network connection. In the embodiment method, failure of a deployment site of the PTT platform does not change a notification method for transmitting notifications to the PTT client.

In accordance with an embodiment, a notification service includes one or more processors and a computer readable storage medium storing programming for execution by the one or more processors. The programming includes instructions to receive a notification from a first component of a push-to-talk (PTT) platform. The notification is for transmission to a PTT client on a client device. The programming includes further instructions to determine an access transport type used by the PTT client to communicate with the PTT platform, select a second component to transmit the notification to the PTT client, and transmit the notification to the second component. The access transport type used by the PTT client is stored in a database, and selecting the second component is in accordance with the access transport type used by the PTT client.

In an embodiment notification service, the database provides information on the access transport type of the PTT client to a plurality of notification services in the PTT platform. Each of the plurality of notification services is deployed at a geographically different deployment site of the PTT platform.

In an embodiment notification service, the instructions to select the second component comprise further instructions to: select a session initiation protocol (SIP) proxy at a same deployment site as the first component to transmit the notification to the PTT client over an internet protocol (IP) multimedia subsystem (IMS) network when the access transport type is the IMS network; and select the SIP proxy at the same deployment site as the first component to transmit the notification to the PTT client using a user datagram (UDP) transport protocol when the access transport type is an unsolicited IP network. In an embodiment notification service, the PTT client does not maintain a redundant notification path with the PTT platform when the access transport type is the IMS network or the unsolicited IP network.

In an embodiment notification service, the instructions to select the second component comprise further instructions to select first gateway maintaining a first notification channel with the PTT client to transmit the notification to the PTT client when the access transport type is not over an IMS network or when the access transport type used by the PTT client does not allow unsolicited internet protocol (IP) traffic.

In an embodiment notification service, the access transport type is not over an IMS network, and the access transport type used by the PTT client does not allow unsolicited internet protocol (IP) traffic. In an embodiment notification service, a primary notification channel between the PTT client and the PTT platform is unreachable, and the instructions to select the second component to transmit the notification comprises further instructions to select a first gateway maintaining a redundant notification channel with the PTT client. In an embodiment notification service, the PTT client established the primary notification channel with a second gateway of the PTT platform. The first gateway maintaining the redundant notification channel with the PTT client is: deployed as part of the PTT platform at a different deployment site of the PTT platform than the second gateway, deployed at a third party deployment site independent from the PTT platform, or deployed as part of a mobile operating system (OS) platform-specific notification service. In an embodiment notification service, the PTT client is a web browser based PTT client, a PTT client provided by a third party independent from a provider of the PTT platform, or a combination thereof.

In accordance with an embodiment, a push-to-talk (PTT) platform includes a database, one or more processors, and a computer readable storage medium storing programming for execution by the one or more processors. The programming includes instructions to provide a session initial proxy (SIP) registrar. The SIP registrar is configured to store an access transport type of a PTT client in the database. The programming includes instructions to provide a PTT application service to a PTT client on a client device and provide a notification service. The notification service is configured to receive a notification from the PTT application service. The notification is addressed to the PTT client. The notification service is further configured to determine the access transport type of the PTT client, select a component to transmit the notification to the PTT client, and transmit the notification to the component. Selecting the component is in accordance with the access transport type of the PTT client. In an embodiment PTT platform, the component is a SIP proxy of the PTT platform located in a same deployment site as the PTT application service. In an embodiment PTT platform, the component is a WebSocket gateway of the PTT platform. In an embodiment PTT platform, the component is deployed at a third party deployment site independent from the PTT platform or deployed as part of a mobile operating system (OS) platform-specific notification service.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method comprising:
receiving, by a processor of a first deployment site of a push-to-talk (PTT) platform, from a PTT client protected by a firewall that does not permit unsolicited network traffic, a registration request to establish a primary notification channel;
establishing, by the processor of the first deployment site, the primary notification channel for the purpose of signaling between the PTT client and the PTT platform;
receiving, by a processor of a second deployment site of the PTT platform, from the PTT client protected by the firewall that does not permit unsolicited network traffic, a registration request to establish a secondary notification channel;
establishing, by the processor of the second deployment site, the secondary notification channel, wherein the secondary communication channel utilizes a UDP transport protocol;
determining, by the PTT platform, that the primary notification channel has failed;
providing an indication of the failure of the primary notification channel to the PTT client over the secondary notification channel; and
re-establishing the primary notification channel, wherein the re-establishment of the primary notification channel is initiated by the PTT client protected by the firewall that does not permit unsolicited network traffic.

2. The method of claim 1, wherein the first processor and the second processor are physically different processors.

3. The method of claim 1, wherein the first deployment site and the second deployment site are geographically diverse.

4. The method of claim 1 wherein the secondary notification channel is established using a protocol selected from the group of protocols consisting of Session Initiation Protocol (SIP), Message Queueing Telemetry Transport (MQTT), and Websocket.

5. The method of claim 1 wherein the secondary notification channel is an open Operating System (OS) notification channel.

6. The method of claim 5 wherein the open OS notification channel is selected from the group of open OS notification channels consisting of Apple Notification Service and Google Notification Service.

7. A system comprising:
a first processor;
a second processor; and
a non-transitory processor readable medium storing a set of instructions thereon on that when executed by the first and second processors cause the processor to:
receive, by the first processor at a first deployment site of a push-to-talk (PTT) platform, from a PTT client protected by a firewall that does not permit unsolicited network traffic, a registration request to establish a primary notification channel;
establish, by the first processor of the first deployment site, the primary notification channel for the purpose of signaling between the PTT client and the PTT platform;
receive, by a second processor at a second deployment site of the PTT platform, from the PTT client protected by the firewall that does not permit unsolicited network traffic, a registration request to establish a secondary notification channel;
establish, by the second processor of the second deployment site, the secondary notification channel, wherein the secondary communication channel utilizes a UDP transport protocol;
determine, by the PTT platform, that the primary notification channel has failed;
provide an indication of the failure of the primary notification channel to the PTT client over the secondary notification channel; and
re-establish the primary notification channel, wherein the re-establishment of the primary notification channel is initiated by the PTT client protected by the firewall that does not permit unsolicited network traffic.

8. The system of claim 7, wherein the first processor and the second processor are physically different processors.

9. The system of claim 7, wherein the first deployment site and the second deployment site are geographically diverse.

10. The system of claim 7 wherein the secondary notification channel is established using a protocol selected from the group of protocols consisting of Session Initiation Protocol (SIP), Message Queueing Telemetry Transport (MQTT), and Websocket.

11. The system of claim 7 wherein the secondary notification channel is an open Operating System (OS) notification channel.

12. The system of claim 11 wherein the open OS notification channel is selected from the group of open OS notification channels consisting of Apple Notification Service and Google Notification Service.

13. A non-transitory processor readable medium storing a set of instructions thereon on that when executed by a processor at a deployment site cause the processor to:
receive, by a processor at a first deployment site of a push-to-talk (PTT) platform, from a PTT client protected by a firewall that does not permit unsolicited network traffic, a registration request to establish a primary notification channel;
establish, by the processor of the first deployment site, the primary notification channel for the purpose of signaling between the PTT client and the PTT platform;
receive, by a processor at a second deployment site of the PTT platform, from the PTT client protected by the firewall that does not permit unsolicited network traffic, a registration request to establish a secondary notification channel; and
establish, by the processor of the second deployment site, the secondary notification channel, wherein the secondary communication channel utilizes a UDP transport protocol;
determine, by the PTT platform, that the primary notification channel has failed;
provide an indication of the failure of the primary notification channel to the PTT client over the secondary notification channel; and
re-establish the primary notification channel, wherein the re-establishment of the primary notification channel is initiated by the PTT client protected by the firewall that does not permit unsolicited network traffic.

14. The medium of claim 13, wherein the first processor and the second processor are physically different processors.

15. The medium of claim 13, wherein the first deployment site and the second deployment site are geographically diverse.

16. The medium of claim 13 wherein the secondary notification channel is established using a protocol selected from the group of protocols consisting of Session Initiation Protocol (SIP), Message Queueing Telemetry Transport (MATT), and Websocket.

17. The medium of claim 13 wherein the secondary notification channel is an open Operating System (OS) notification channel.

18. The medium of claim 17 wherein the open OS notification channel is selected from the group of open OS notification channels consisting of Apple Notification Service and Google Notification Service.

* * * * *